United States Patent Office 3,770,743
Patented Nov. 6, 1973

3,770,743
1-(1,3-DIOXOLAN-4-YL-ALKYL)-PIPERAZINES AND PIPERAZINE ALKANE DIOLS
Waldo Richard Hardie, Walnut Creek, and Donald L. Tankersley, Oakland, Calif., assignors to Cutter Laboratories, Inc., Berkeley, Calif.
No Drawing. Filed Mar. 8, 1971, Ser. No. 122,144
Int. Cl. C07d 51/70
U.S. Cl. 260—268 PH                 24 Claims

ABSTRACT OF THE DISCLOSURE 1-(2-$R_1$,2-$R_2$-1,3-dioxolan-4-yl-alkyl)-4 - phenyl piperazines wherein alkyl contains 1–8 carbon atoms and $R_1$ and $R_2$ each are a hydrogen atom, alkyl, cycloalkyl or phenyl or, collectively are alkylene, have pharmacological activity, including blood pressure-lowering activity, also analgesic and alpha adrenergic blocking activity.

BACKGROUND OF THE INVENTION

This invention relates to novel 1-(1,3-dioxolan-4-yl-alkyl)-piperazines.

A 1-(1,3-dioxolan-4-yl-methyl)piperazine unsubstituted on the N'-nitrogen atom is known from A. R. Patel and J. F. Oneto, J. Pharm. Sci., 52, 588 (1963). 1-(1,3-dioxolan-2-yl-ethyl)-piperazines substituted on the N'-nitrogen atom by benzhydryl are disclosed as spasmolytics, antinaupathics and antitussives in French Pat. 7,239M. 1-(1,3-dioxolan-2-yl-ethyl)-piperazines substituted on the N'-nitrogen atom by benzyl are also known (French Pat. 1,554,878). 1 - phenyl and 1 - chloro - phenyl-4-(2,3-dihydroxypropyl)-piperazines are disclosed in Belgium Pat. 601,394 as antitussives.

SUMMARY OF THE INVENTION

The invention sought to be patented, in one composition aspect, resides in the concept of 1-(1,3-dioxolan-4-yl-lower-alkyl)-piperazines bearing as their sole substituents a phenyl group attached by a ring carbon atom thereof to the 4-position nitrogen atom of the piperazine ring and, at the 2-position carbon atom of the dioxolane ring, 0–2 of alkyl, cycloalkyl and phenyl or, alternatively, an alkylene group forming a spiro ring with the 2-position carbon atom of the dioxolane ring.

The invention sought to be patented, in another composition aspect, resides in the concept of ω-(4-phenyl-piperazinyl)-alkane-1,2-diols useful as intermediates in the preparation of the above-described 1-(1,3-dioxolan-4-yl-lower-alkyl)-piperazines and as pharmacological agents per se.

The tangible embodiments of this invention, in their free base and pharmaceutically acceptable acid addition salt forms, are novel chemical compounds whose utility includes the inherent applied use characteristic of exhibiting pharmacological activity, e.g. blood pressure lowering activity.

DETAILED DISCUSSION

The novel dioxolanes of this invention can be represented by the formula

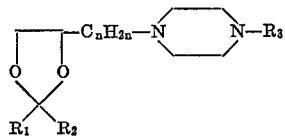

(I)

wherein n is an integer from 1–8, $R_1$ and $R_2$ each are hydrogen atoms, alkyl or, collectively or singly, a cyclic structure as defined herein and $R_3$ is a phenyl group attached by a ring carbon atom thereof.

The novel glycols of this invention employed as intermediates in the production of dioxolanes of Formula I can be represented by the formula

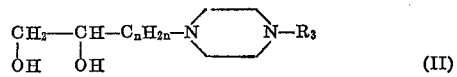

(II)

wherein n and $R_3$ have the values given above. Certain of these compounds, i.e. those wherein n is 3–6, preferably 3–5, also have pharmacological activity, e.g. analgesic, blood pressure lowering and epi reversal (α-blocking) activity. Corresponding compounds wherein n is 1 or 2 have a different spectrum of activity.

The structural feature common to all the tangible embodiments of the novel dioxolanes of this invention is the molecular chemical combination of the 1-(1,3-dioxolan-4-yl-alkyl)-piperazine structure and a phenyl group attached by a ring carbon atom thereof to the 4-position nitrogen atom of the piperazine ring. Both the free base and acid addition salt forms of these novel chemical compounds are useful in scientific research, particularly in the field of pharmacology. Their utility includes the inherent applied use characteristic of exhibiting pharmacological activity, including blood pressure lowering activity, as evidenced by pharmacological evaluation according to standard test procedures. They can be used to modify body functions in laboratory test animals. In the representative compounds made and tested, their pharmacological activity manifested itself as blood pressure lowering activity. In many, their activity also manifested itself as local anesthesia and/or analgesia. As in all classes of chemical compounds, the manifestation of pharmacological activity varies in degree and character from member to member in this novel class of compounds. Thus, other pharmacological activities possessed by members of the group of compounds of this invention include alpha adrenergic blocking activity and antispasmodic activity against $BaCl_2$ induced spasm. As a class, they have a low order of toxicity.

The compounds of this invention can be unsubstituted at the 2-position of the dioxolane ring or bear one or two substituents, which can be alike or different, selected from lower-alkyl and a neutral cyclic structure as defined herein.

The neutral cyclic structure at the 2-position carbon atom of the dioxolane ring contains at least one carbocyclic ring, e.g. 1–3 fused or separate rings, one of which rings is in carbon-to-carbon linkage with the 2-position carbon atom of the dioxolane ring. The carbocyclic ring can be cycloalkyl, phenyl, or spiroalkyl in which the 2-position carbon atom of the dioxolane ring is also a ring carbon atom of the carbocyclic ring. Examples of cycloalkyl rings are those containing 3–9 ring carbon atoms, e.g. cyclopropyl, cyclopentyl, cyclohexyl, cycloheptyl, 1,4 - methylenecyclohexyl, cyclopentenyl, cyclohexenyl, cyclopentadienyl, cyclohexadienyl, decahydronaphthyl, octahydronaphthyl, perhydroanthracyl and perhydrophenanthryl. Of these, cyclopentyl and cyclohexyl are preferred. Examples of spiroalkyl rings are those in which the 2-position carbon atom of the dioxolane ring is a ring carbon thereof are cyclopropyl, cyclobutyl, cyclopentyl, cyclohexyl, cycloheptyl, cyclooctyl and cyclononyl. Compounds which can be prepared in the same manner as the compounds of this invention and possess the same utility are those bearing, instead of a phenyl group at the 2- and/or N'-position, another aryl group containing, e.g. 1–3 separate or fused carbocyclic rings, e.g. biphenylyl, p-benzylphenyl, naphthyl, fluorenyl and phenanthryl. Such aryl groups have a molecular weight less than 200, preferably less than 150. Other compounds which can be prepared in the same manner and possess the same utility are those in which a 2-position cycloalkyl or phenyl group, instead of being attached directly to the 2-position ring carbon atom of the dioxolane ring, is separated by a carbon chain containing 1–8 carbon atoms in the chain, preferably no more than one carbon atom. Examples of such cyclic systems in which the carbocyclic ring is separated by a carbon chain are aralkyl, e.g. benzyl, diphenylmethyl, triphenylmethyl, phenethyl, α-phenylethyl, α-phenylpropyl and α-cyclopentylbenzyl, cycloalkylalkyl, e.g. cyclohexylmethyl and dicyclohexylmethyl. Of this class, preferred are benzyl and diphenylmethyl. The cyclic structure can be a combination of cycloalkyl and aryl, e.g. indanyl and tetrahydronaphthyl attached by either the benzene or cycloalkyl ring.

Of the above-described neutral cyclic structure, phenyl is preferred over cycloalkyl and spiroalkyl.

When one of $R_1$ and $R_2$ is phenyl or cycloalkyl, i.e. a cyclic structure which satisfies only one valence of the 2-position carbon atom of the dioxolane ring, the remaining valence can be satisfied by a hydrogen atom; an alkyl group, e.g. a lower-alkyl group; or a neutral carbocyclic structure as defined above. In the most active and thus preferred compounds, the second valence of the 2-position carbon atom is satisfied by an alkyl group as defined below, most preferably ethyl. Compounds possessing the utility of the compounds of this invention are those bearing as a 2-position substituent an essentially neutral, i.e. an essentially non-acidic and non-basic, heterocyclic structure. Preferred are those in which the hetero atom or atoms of the heterocyclic ring are oxygen or sulfur, e.g. furyl, tetrahydrofuryl, pyranyl, tetrahydropyranyl, dioxanyl, thienyl, benzofuryl, etc. attached by a ring carbon atom. Preferably such a heterocyclic structure contains no more than 2 and more preferably only one heteroatom. The utility of the compounds of this invention is not affected by the presence on a 2-position alkyl group of an essentially neutral substituent, e.g. hydroxy-lower-alkyl, halo-lower-alkyl, lower-alkoxy-lower-alkyl and lower-acyloxy-lower-alkyl.

The term alkyl as used herein with reference to the 2-position substituents means lower or higher alkyl, but preferably alkyl containing 1–8 carbon atoms, more preferably 1–4, e.g. methyl, ethyl, propyl, isopropyl, butyl, iso- and tertiary butyl, amyl, hexyl, heptyl, and octyl. As stated above, when both $R_1$ and $R_2$ are alkyl groups, they can be joined together into a single divalent alkylene group to form, with the 2-position carbon atom, a spirocyclic ring, e.g. tetramethylene, pentamethylene, 3-methylpentamethylene, 3,3-dimethylpentamethylene.

The term cycloalkyl means preferably monocyclic cycloalkyl containing 3–8, more preferably 5 or 6 ring carbon atoms, e.g. cyclopropyl, cyclobutyl, cyclopentyl, cyclohexyl, cycloheptyl and cyclooctyl, optionally ring substituted with one, 2 or more methyl, ethyl or other lower-alkyl group.

Because novelty and utility of the compounds are the result of the molecular chemical combination of the 1-(1,3-dioxolan-4-yl-alkyl)-piperazine structure in combination with the phenyl group at the 4-position of the piperazine ring, the compounds having this structural combination may also have one or more, usually not more than a total of four and preferably not more than three, simple substituents on an alkyl group or neutral cyclic structure at the 2-position of the dioxolane ring and/or the phenyl group at the 4-position of the piperazine ring. Such simple substituents include but are not limited to halo, e.g. chloro, bromo, and fluoro, lower-alkyl, including methyl, ethyl, propyl and octyl, trifluoromethyl, trichloromethyl, lower-alkoxy, including methoxy and ethoxy, aryloxy and aralkoxy, including benzyloxy and phenoxy, lower-acyloxy, including acetoxy, propoxy and benzoxy, carbo-lower-alkoxy, including carbethoxy and carbomethoxy, nitro, acetamido, and N-lower-alkyl acetamido. However, preferably, so that the activity of the compounds is predominantly that resulting from the novel combination of the 1-(1,3-dioxolan-4-yl-alkyl)-piperazine structure and the phenyl group at the 4-position of the piperazine ring, the sum of the molecular weight of such substituents is less than 150, and more preferably less than 100.

For the same reason, the substituents at the 2-position of the dioxolane ring preferably have a combined molecular weight of less than 250, more preferably less than 200. When the 2-position carbon atom bears, in addition to the cyclic structure described above, a lower-alkyl group or a second cyclic structure, its molecular weight is included in this preferred molecular weight upper limit.

When the compounds of this invention are produced under acidic conditions and in accordance with the below-described methods, the compounds of Formula I are obtained in the form of an acid addition salt thereof. When the various methods are carried out under alkaline conditions, compounds of Formula I are produced in free base form.

A compound of Formula I in free base form obtained in accordance with a process of this invention can be converted into an acid addition salt, preferably a physiologically acceptable acid addition salt, thereof by treatment with an acid, in a conventional manner. The physiologically acceptable salts can be obtained employing organic and inorganic acids, such as, for example, aliphatic, alicyclic, araliphatic, aromatic or heterocyclic, mono- or polybasic carboxylic or sulfonic acids, including formic acid, acetic acid, propionic acid, pivalic acid, diethylacetic acid, oxalic acid, malonic acid, succinic acid, pimelic acid, fumaric acid, maleic acid, lactic acid, tartaric acid, malic acid, aminocarboxylic acids, sulfamic acid, benzoic acid, salicyclic acid, phenylpropionic acid, citric acid, gluconic acid, ascorbic acid, isonicotinic acid, methanesulfonic acid, β-hydroxyethanesulfonic acid, p-toluenesulfonic acid, naphthalene-mono- and -disulfonic acids, sulfuric acid, nitric acid, hydrohalic acids, such as hydrochloric acid or hydrobromic acid, or phosphoric acids, such as orthophosphoric acid, etc. Other acids can be employed to produce other acid addition salts for resolution, isolation, characterization and/or purification purposes, e.g., picrate or dinitro-benzoate.

Preferred acid addition salts are the hydrohalides, especially the hydrochlorides and hydrobromides, the sulfates, and the addition salts with other strong acids.

In addition to the compounds whose preparation is described in detail hereinafter, the following are specific examples of the compounds of this invention:

1-(2-n-propyl-2-n-butyl-1,3-dioxolan-4-yl-ethyl)-4-phenyl-piperazine,
1-(2,2-di-n-amyl-1,3-dioxolan-4-yl-ethyl)-4-phenyl-piperazine,
1-(2-benzyl-1,3-dioxolan-4-yl-ethyl)-4-phenyl-piperazine,
1-(2,2-dibenzyl-1,3-dioxolan-4-yl-ethyl)-4-phenyl-piperazine,
1-(2-α-thienyl-1,3-dioxolan-4-yl-ethyl)-4-phenyl-piperazine,
1-(2-α-naphthyl-1,3-dioxolan-4-yl-ethyl)-4-phenyl-piperazine,
1-(2,2-di-n-butyl-1,3-dioxolan-4-yl-ethyl)-4-α-naphthyl-piperazine,
1-(2,2-di-n-butyl-1,3-dioxolan-4-yl-ethyl)-4-p-diphenyl-piperazine,
1-(2,2-di-n-butyl-1,3-dioxolan-4-yl-ethyl)-4-p-tolyl-piperazine, 1-(2,2-di-n-butyl-1,3-dioxolan-4-yl-ethyl)-4-methoxy-phenyl-piperazine,
1-(2,2-di-n-butyl-1,3-dioxolan-4-yl-ethyl)-4-p-phenoxy-phenyl-piperazine,
1-(2,2-di-n-butyl-1,3-dioxolan-4-yl-ethyl)-4-m-chlorophenyl-piperazine,
1-(2,2-di-n-butyl-1,3-dioxolan-4-yl-ethyl)-4-m-trifluoromethyl-phenyl-piperazine,
1-(2,2-di-n-butyl-1,3-dioxolan-4-yl-ethyl)-4-m-carbomethoxy-phenyl-piperazine,
1-(2,2-di-n-butyl-1,3-dioxolan-4-yl-ethyl-4-m,m'-dinitro-phenyl-piperazine,
1-(2,2-di-n-butyl-1,3-dioxolan-3-yl-ethyl)-4-m-carbamido-phenyl-piperazine,
1-(2,2-di-nbutyl-1,3-dioxolan-4-yl-ethyl)-4-p-acetamido-phenyl-piperazine,
1-(2-methyl-2-α-naphthyl-1,3-dioxolan-4-yl-ethyl)-4-phenyl-piperazine,
1-(2-methyl-2-α-naphthyl-1,3-dioxolan-4-yl-ethyl)-4-α-naphthyl-piperazine,
1-(2-methyl-2-α-naphthyl-1,3-dioxolan-4-yl-ethyl)-4-p-diphenyl-piperazine,
1-(2-methyl-2-α-naphthyl-1,3-dioxolan-4-yl-ethyl)-4-p-tolyl-piperazine,
1-(2-methyl-2-α-naphthyl-1,3-dioxolan-4-yl-ethyl)-4-methoxyphenyl-piperazine,
1-(2-methyl-2-α-naphthyl-1,3-dioxolan-4-yl-ethyl)-4-p-phenoxyphenyl-piperazine,
1-(2-methyl-2-α-naphthyl-1,3-dioxolan-4-yl-ethyl)-4-m-chlorophenyl-piperazine,
1-(2-methyl-2-α-naphthyl-1,3-dioxolan-4-yl-ethyl)-4-m-trifluoro-methoxyphenyl-piperazine,
1-(2-methyl-2-α-naphthyl-1,3-dioxolan-4-yl-ethyl)-4-m-carbomethoxy-phenyl-piperazine,
1-(2-methyl-2-α-naphthyl-1,3-dioxolan-4-yl-ethyl)-m-m'-dinitro-phenyl-piperazine,
1-(2-methyl-2-α-naphthyl-1,3-dioxolan-4-yl-ethyl)-4-m-carbamido-phenyl-piperazine,
1-(2-methyl-2α-naphthyl-1,3-dioxolan-4-yl-ethyl)-4-acetamido-phenyl-piperazine,
1-[3-(2,2-di-β-hydroxyethyl-1,3-dioxolan-4-yl)-propyl]-4-pehnyl-piperazine,
1-[3-(2,2-di-β-chloroethyl-1,3-dioxolan-4-yl)-propyl]-4-penyl-piperazine,
1-[3-(2,2-di-β-acetoxyethyl-1,3-dioxolan-4-yl)-propyl]-4-phenyl-piperazine,
1-[3-(2,2-di-β-benzyloxyethyl-1,3-dioxolan-4-yl)-propyl]-4-phenyl-piperazine,
1-[3-(2,2-di-β-ethoxyethyl-1,3-dioxolan-4-yl)-propyl]-phenyl-piperazine, including the hydrochloride of each.

Of the compounds of Formula I, preferred are the following classes:

(a) $R_3$ is a phenyl group, preferably unsubstituted;
(b) $C_nH_{2n}$ is $(CH_2)_m$ wherein $m$ is the integer 2, 3, or 4;
(c) Members of (b) wherein $R_3$ is phenyl;
(d) One or both of $R_1$ and $R_2$ is alkyl, preferably of at least 3 carbon atoms;
(e) Members of (d) wherein $R_3$ is phenyl;
(f) Members of (d) wherein $m$ is the integer 2, 3, or 4; and
(g) Members (a)–(f) in pharmaceutically acceptable acid addition salt form, preferably the hydrochloride. An especially preferred class has the formula

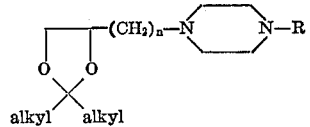

wherein R is a substituted or unsubstituted phenyl group, and preferably unsubstituted, alkyl contains 1–6 carbon atoms, preferably 1–5, and $n$ is 2, 3 or 4.

The manner of making and using the invention will now be generally described so as to enable a person skilled in the art to make and use the same.

The dioxolanes of this invention can be prepared by the general method of condensing the appropriate ketone, aldehyde or acetal with a piperazinyl vicinal glycol in the presence of an acid catalyst. The starting acetals can be prepared by several methods. One method, Method A, described by Lorette and Howard, J. Org. Chem., 25, 521 (1960), involves an exchange reaction using the ketone whose acetal is desired and 2,2-dimethoxypropane. This method was used with several aliphatic and mixed ketones and with benzophenone, whose acetal can also be prepared by reaction with dimethyl sulfite. Another method described by W. Schlenk and E. Bergmann, Ann. Chem., 463, 98 (1928), Method B, shown below, was used to prepare acetals of the substituted aromatic ketones 4,4'-dimethoxybenzophenone, phenyl 2-thienyl ketone, and 9-fluorenone.

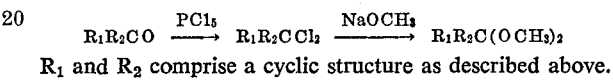

$R_1$ and $R_2$ comprise a cyclic structure as described above.

The compounds of this invention and their preparation are illustrated by the following formulae.

METHOD I (Preferred when $n$ is greater than 1)

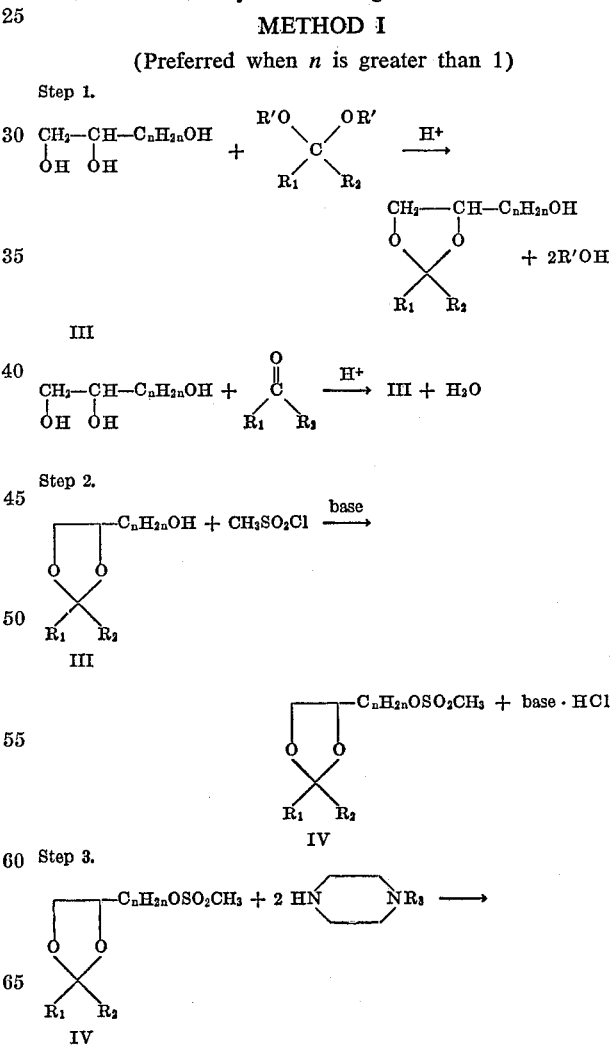

In step 1, when the acetal is used, the reaction may be carried out in a lower alkanol, e.g. ethanol or propanol, either at room temperature or at reflux temperature, using an acid catalyst, e.g. hydrogen chloride or p-toluenesulfonic acid. When the ketone or aldehyde is used, benzene or toluene preferably is used as solvent to remove the water by azeotropic distillation. p-Toluenesulfonic acid is the preferred catalyst.

In step 2, methanesulfonyl chloride is the preferred esterifying reagent. However, p-toluenesulfonyl chloride, or other sulfonyl chloride may also be used to prepare a reactive sulfonate ester for use in step 3. The neutralizing base may be any tertiary amine, e.g. dry pyridine or triethylamine. The reaction is preferably run at below room temperature, e.g. between —20 and —10° C.

Step 3 may be run in the absence of solvent at elevated temperatures, e.g. about steam bath temperature.

Compounds wherein $n=1$ may also be prepared by the following sequence:

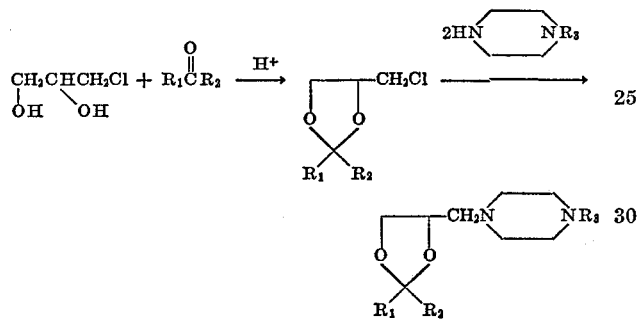

Relatively low yields are realized in the second step of this route.

METHOD II
($n=1$)

Step 1.

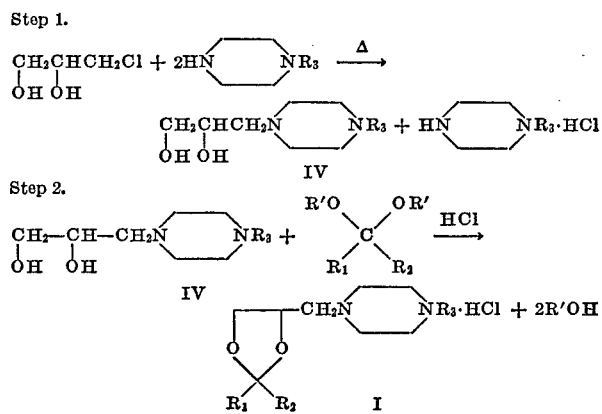

Step 2.

In step 1, only one mole of the appropriately substituted piperazine need be used if a mole of a tertiary amine such as triethylamine or inorganic base, e.g., $Na_2CO_3$, is added to react with the hydrogen chloride as it is formed. The reaction shown above may be conducted without solvent at steam bath temperatures or a solvent such as ethanol or propanol may be used.

In step 2, the piperazinomethylglycol is more conveniently used in the form of its dihydrochloride salt. R' in the acetal is lower alkyl, conveniently n-propyl. The solvent for the reaction is a lower alkanol such as ethanol, isopropanol, or n-propanol. Other strong acids such as sulfuric, p-toluenesulfonic acid may be used, but hydrogen chloride is preferable.

METHOD III

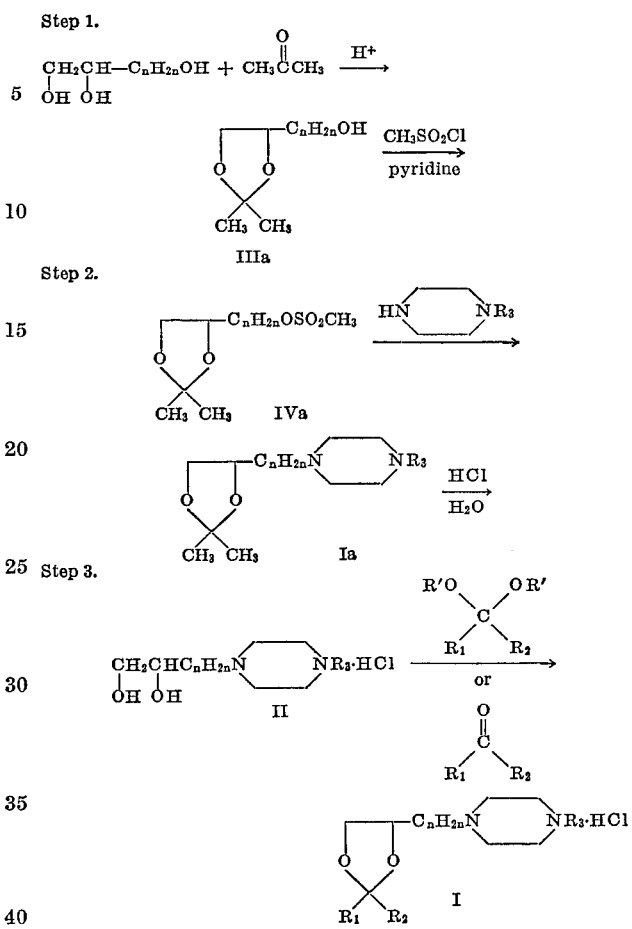

In the above formulae, $R_1$, $R_2$ and $R_3$ and $n$ have the values given above and R', whenever it appears, means lower-alkyl, preferably methyl.

The glycols of Formula II wherein $n$ is the integer 3, 4 or 5, in addition to their use as intermediates for the production of the corresponding dioxolanes of Formula I, have the inherent use characteristic of exhibiting pharmacological activity, more specifically alpha adrenergic blocking activity which renders them useful as agents in the treatment of hypertensive conditions.

Preferred glycols are those of Formula II wherein $R_3$ is a phenyl group, preferably unsubstituted phenyl.

The novel compounds can be employed as a mixture with solid, liquid and/or semi-liquid carrier and/or excipients conventional in pharmaceutical chemistry. Suitable carriers are those organic or inorganic materials which are suitable for parenteral, enteral, or topical application, and which do not react with the novel compounds. These carriers include, for example, water, vegetable oils, polyethylene glycols, gelatin, lactose, amylose, magnesium stearate, talc, vaseline, cholesterol. Especially suitable for parenteral administration are solutions, particularly oily or aqueous solutions, as well as suspensions or emulsions. The compounds can be administered orally as tablets, capsules, dragées, etc.

Optionally, the compounds of this invention can also be combined with other therapeutically effective agents, e.g., with hypnotics, analgesics, spasmolytics and/or antihistamines.

The compounds of this invention, including the acid addition salts thereof, are preferably administered in an effective dosage of between 0.1 and 500 mg., preferably 50 to 300 mg., per dosage unit and preferably in admixture with 50 to 1000 mg. of a pharmaceutically acceptable carrier.

The piperazine compounds of Formulae I or II are generally high-boiling in their free base form and are more conveniently used as acid addition salts. Where $R_1$ and $R_2$ of the compounds of Formula I are different, two centers of asymmetry exist and the two possible racemates may be separated by fractional crystallization of an appropriate salt or the racemates may be separated in the form of their free bases by column chromatography. If the bridging alkylene group ($_nH_{2n}$) is branched so as to form another asymmetric center, then four racemates are possible. Optical isomers of the various racemates are obtainable by resolution employing suitable optically active organic acids or they may be synthesized by the schemes shown above in (a) or (b) by starting with optically active alkanetriols, e.g.,

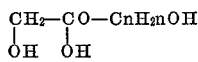

(+) or (−) rotation when $n$ is 2 or more. When a second center of asymmetry is introduced, i.e., when $R_1$ and $R_2$ are different, a mixture of two diastereo isomers is obtained and these may be separated by either fractional crystallization of their salts or by column chromatography on the free bases.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

PREPARATIONS (1) 3-(4-phenylpiperazinyl)-1,2-propanediol

While refluxing a solution of 200 g. of N-phenylpiperazine and 131 g. of triethylamine in 500 ml. of n-propanol, a solution of 144 g. of 3-chloro-1,2-propanediol in 500 ml. of n-propanol was added over a period of 30 minutes and the mixture was refluxed for six hours. Seventy grams of sodium methoxide was added with stirring and the mixture was diluted with 2 liters of ether and filtered. The filtrate was evaporated and the concentrated solution was distilled at about 17 mm. at steam bath temperatures finally removing volatiles boiling up to 89° at 0.35 mm. The residue crystallized and was washed with dry ether to give 134 g. of 3-(4-phenylpiperazinyl)-1,2-propanediol, melting at 104–106° C. A solution of 77 g. of the base in 400 ml. isopropanol was neutralized with two equivalents of hydrogen chloride dissolved in 200 ml. ethanol. The dihydrochloride salt precipitated, melting at about 214–6° C. One equivalent of HCl gives the monohydrochloride salt, melting at 143–144° C.

(2) 4-(4-phenylpiperazinyl)-1,2-butanediol (A) 2,2-dimethyl-1,3-dioxolane-4-ethanol.—A mixture of 215 g. of 1,2,4-butanetriol, 600 ml. acetone, 375 ml. pentane, 325 ml. hexane, and 6.0 g. p-toluene sulfonic acid monohydrate was stirred and heated to reflux, allowing the distillate to condense and collect in a Dean-Stark trap over a period of 24 hours. Eight grams of anhydrous sodium acetate was added, the mixture was stirred about an hour and then filtered. The filtrate was concentrated and distilled, collecting 236 g. of 2,2-dimethyl-1,3-dioxolane-4-ethanol, boiling at 102–104°/15 mm., $n_D^{27} = 1.4385$.

(B) 2-(2,2-dimethyl-1,3-dioxolan-4-yl)-ethyl methanesulfonate.—To 128.5 g. of 2,2-dimethyl-1,3-dioxolane-4-ethanol in 160 ml. dry pyridine at −20° C. was added with stirring 69.5 ml. methanesulfonyl chloride over a period of 30 minutes, keeping the temperature below 0°. Stirred two hours at about 0° and allowed temperature to rise to room temperature over the next two hours. The mixture was poured onto about 500 g. of ice containing 100 ml. of 28% ammonium hydroxide and extracted with ether. The ether extract was washed repeatedly with about 2% sodium bicarbonate solution and finally dried over anhydrous potassium carbonate. The ether was removed under reduced pressure on the steam bath, leaving an oily residue of 186 g. of 2-(2,2-dimethyl-1,3-dioxolan-4-yl) ethyl methanesulfonate.

(C) 4-(4-phenylpiperazinyl)-1,2-butanediol.—A mixture of 8.5 g. of 1-[2-(2,2-dimethyl-1,3-dioxolan-4-yl) ethyl]-4-phenylpiperazine hydrochloride (Example 30), 1 ml. of concentrated HCl, and 1 ml. water in 25 ml. methanol was refluxed two hours. The solvent and water was removed and crystallization of the residue from isopropanol gave 4-(4-phenylpiperazinyl)-1,2-butanediol dihydrochloride, melting at 197–202° C. Addition of dry ether to the mother liquor, resulted in the isolation of the monohydrochloride salt, melting at 124–126° C.

(3) 5-(4-phenylpiperazinyl)-1,2-pentanediol (A) 2,2-dimethyl-1,3-dioxolane-4-propanol.—Following the procedure for preparation 2(A), 96 g. of 1,2,5-pentanetriol (prepared according to Organic Synthesis, coll. vol. III, p. 834) was allowed to react with 300 ml. acetone in 150 ml. each of pentane and hexane containing 3 g. p-toluenesulfonic acid. There was obtained 106 g. of 2,2-dimethyl-1,3-dioxolane-4-propanol, boiling at 121–125°/16 mm., $n_D^{25} = 1.4413$.

(B) 3-(2,2-dimethyl-1,3-dioxolan-4-yl)propyl methanesulfonate.—Following the procedure for preparation 2(B), 106 g. of 2,2-dimethyl-1,3-dioxolane-4-propanol in 133 g. dry pyridine was treated with 63 ml. of methanesulfonyl chloride. There was obtained 152 g. of 3-(2,2-dimethyl-1,3-dioxolan-4-yl)propyl methanesulfonate.

(C) 5-(4-phenylpiperazinyl)-1,2-pentanediol.—Following the procedures for the first part of Example 35 and preparation 2(C), 20.2 g. of 3-(2,2-dimethyl-1,3-dioxolan-4-yl)propyl methanesulfonate was heated with 26 g. of 1-phenylpiperazine. There was obtained 24.1 g. of oily 1-[3-(2,2-dimethyl-1,3-dioxolan-4-yl)-propyl]-4-phenylpiperazine. This was refluxed in 200 ml. ethanol containing 15 ml. concentrated HCl for 30 minutes. After removing the ethanol and water at reduced pressures, the residue was heated in isopropanol to azeotrope any remaining water, cooled, and filtered to give 22 g. of 5-(4-phenylpiperazinyl)-1,2-pentanediol dihydrochloride, melting at 208–209° C.

(4) 4-chloromethyl-2-ethyl-2-phenyl-1,3-dioxolane

A mixture of 134 g. of propiophenone, 111 g. 3-chloro-1,2-propanediol, and 2 g. p-toluenesulfonic acid monohydrate in 500 ml. toluene was refluxed until approximately 18 ml. of water had been collected in a Dean-Stark trap. A solution of sodium methoxide in methanol was added until the pH was about 8. The toluene solution was washed with 5% NaOH, then water, and dried over anhydrous $K_2CO_3$. Toluene was removed and the residue distilled to give 177 g. of 4-chloromethyl-2-ethyl-2-phenyl-1,3-dioxolane, boiling at 89–93°/0.5 mm.

(5) 4-chloromethyl-2,2-diphenyl-1,3-dioxolane

Following the procedure of preparation 4, 185 g. benzophenone was allowed to react with 111 g. 3-chloro-1,2-propanediol to give 118 g. of 4-chloromethyl-2,2-diphenyl-1,3-dioxolane, crystals from methanol, melting at 52–54° C.

(6) 2-(2-ethyl-2-phenyl-1,3-dioxolan-4-yl) ethyl methanesulfonate (A) 2-ethyl-2-phenyl-1,3-dioxolane-4-ethanol.—A mixture of 106 g. of 1,2,4-butanetriol, 161 g. of propiophenone, and 3.8 g. p-toluenesulfonic acid monohydrate in 200 ml. dry benzene was stirred vigorously and refluxed until about 18 ml. of water was collected in a Dean-Stark trap. One and one-half grams of sodium methoxide was added and the solution stirred at room temperature for about two hours. After filtering, the benzene was removed and the residue was distilled to give 142 g. of 2-ethyl-2-phenyl-1,3-dioxolane-4-ethanol, boiling at 118–123°/0.3 mm., $n_D^{27} = 1.5133$.

(A') This intermediate was also prepared as follows: A mixture of 53 g. of 1,2,4-butanetriol and 150 g. of propiophenone dipropylacetal in 150 ml. of absolute ethanol, which was acidified with anhydrous HCl to about pH 2, was allowed to stand at room temperature for a day. Added sodium methoxide until pH was about 8, the ethanol was removed and the residue was distilled to give 81.3 g. of 2-ethyl-2-phenyl-1,3-dioxolane-4-ethanol, boiling at 98–117°/0.3 to 0.5 mm., $n_D^{25}=1.5137$.

(B) 2-(2-ethyl-2-phenyl-1,3-dioxolan-4-yl)ethyl methanesulfonate.—Following the procedure for preparation 2B, 111 g. of 2-ethyl-2-phenyl-1,3-dioxolane-4-ethanol in 102 ml. dry pyridine was allowed to react with 47 ml. of methanesulfonyl chloride. There was obtained 152 g. of 2-(2-ethyl-2-phenyl-1,3-dioxolan-4-yl)ethyl methanesulfonate, $n_D^{25}=1.5103$.

(7) 2-(2-ethyl-2-phenyl-1,3-dioxolan-4-yl)ethyl methanesulfonane (from L(−)-1,2,4-butanetriol (A) L(−)-1,2,4-butanetriol.—To a solution of 116 g. KBH$_4$ and 90 g. LiCl in 1.5 l. tetrahydrofuran was added 158 g. of diethyl L(−)-malate (ref.: E. Fischer and A. Speier, Ber., 28, 3252) in 400 ml. tetrahydrofuran with stirring over a 45 minute period. The mixture was refluxed about 18 hours, cooled, and a solution of 85 g. anhydrous HCl in 500 ml. methanol was added slowly. The stirred slurry was distilled, adding methanol from time to time, until no green flame appeared when a few drops of distillate was collected and ignited. Most of the remaining solvent was removed and replaced with 800 ml. isopropanol. The mixture was filtered and the collected KCl was washed further with isopropanol. The isopropanol solution was evaporated to a paste, dissolved in 250 ml. water, 400 ml. of 50% K$_2$CO$_3$ solution was added, heated to 70°, and filtered. The filtrate was evaporated to a thick slush, stirred with a liter of isopropanol, and filtered. The solvent was removed at reduced pressure to give 84.2 g. of syrup whose infrared spectrum was identical to that of a sample of racemic 1,2,4-butanetriol, $n_D^{27}=1.4740$, $\alpha_D^{25}=27.0°$. (c.=7 in methanol).

(B) 2-ethyl-2-phenyl-1,3-dioxolane-4-ethanol (from L(−)-1,2,4-butanetriol.—Following the procedure for preparation 6(A), 53 g. of L(−)-1,2,4-butanetriol was converted to 2-ethyl-2-phenyl-1,3-dioxolane-4-ethanol, 83 g., boiling at 120–128° C. at 0.25 mm., $n_D^{26}=1.5151$, $\alpha_D^{25}=4.3°$ (c.=4.19 in methanol).

(C) 2-(2-ethyl-2-phenyl-1,3-dioxolan-4-yl)ethyl methanesulfonate (from L(−)-1,2,4-butanetriol).—Following the procedure for preparation 2(B), 33.4 g. of the product described in preparation 7(B) was converted to 44.5 g. of 2-(2-ethyl-2-phenyl-1,3-dioxolan-4-yl)ethyl methanesulfonate, $n_D^{27}=1.5069$.

(8) 2-(2-ethyl-2-phenyl-1,3-dioxolan-4-yl)ethyl methanesulfonate (from D(+)-1,2,4-butanetriol)

(A) D(+) - 1,2,4 - butanetriol.—Following the procedure for preparation 7(A), 95 g. of diethyl D(+)-malate was converted to 41.5 g. of D(+)-1,2,4-butanetriol, $n_D^{28}=1.4726$, $\alpha^{25}_D=+21.9°$. The rotation is lower than expected ($\alpha^{25}$ for L(−) was −27.0°) presumably because the D(+)-malic acid used in the synthesis is less pure and contains a small amount of L(−)-malic acid.

(B) 2 - ethyl-2-phenyl-1,3-dioxolane-4-ethanol derived from D(+)-1,2,4-butanetriol.—Following the procedure for preparation 6(A), 26.5 g. of D(+)-1,2,4-butanetriol was converted to 2-ethyl-2-phenyl-1,3-dioxolane-4-ethanol, 35 g., boiling at 114–116°/0.2 mm., $n_D^{29}=1.5125$, $\alpha_D^{26}=+3.55°$ (c.=4.17 in methanol).

(C) 2-(2-ethyl-2-phenyl-1,3-dioxolan-4-yl)ethyl methanesulfonate derived from D(+)-1,2,4-butanetriol.—Following the procedure for preparation 2(B), 33.4 g. of the product from preparation 8(B) was converted to 42 g. of 2 - (2-ethyl-2-phenyl-1,3-dioxolan-4-yl)ethyl methanesulfonate.

(9) 3-(2-ethyl-2-phenyl-1,3-dioxolan-4-yl) butyl methanesulfonate

Following the procedure for preparation 6(A), 134 g. 1,2,6-hexanetriol was converted to 220 g. of 2-ethyl-2-phenyl-1,3-dioxolane-4-butanol, boiling at 153–158°/0.3 mm., $n_D^{26}=1.5077$.

*Analysis.*—Calculated for $C_{15}H_{22}O_3$ (percent): C, 71.97; H, 8.86. Found (percent): C, 72.19; H, 8.90.

Following the procedure for preparation 2(B), 125 g. of 2-ethyl-2-phenyl-1,3-dioxolane-4-butanol was converted to 163 g. of 4-(2-ethyl-2-phenyl-1,3-dioxolan-4-yl)butyl methanesulfonate, $n_D^{28}=1.5048$.

(10) 3,3-dipropoxypentane

Prepared as described in Method E by Lorette and Howard [N. B. Lorette and W. L. Howard, J. Org. Chem., 25, 521 (1960)] using 3-pentanone in place of acetophenone. 3,3-dipropoxypentane boils at 128–130° C./110 mm., $n_D^{28}=1.4136$. C and H analysis acceptable.

(11) 4,4-dipropoxyheptane

Prepared by the Lorette and Howard method using 4-heptanone in place of acetophenone; 4,4-dipropoxyheptane boils at 103–106° C./16 mm. C and H analysis acceptable.

(12) 5,5-dipropoxynonane

Prepared by the Lorette and Howard method using 5-nonanone in place of acetophenone; 5,5-dipropoxynonane boils at 116–122° C. 12 mm., $n_D^{25}=1.4285$.

(13) 3-(2,2-diisopropyl-1,3-dioxolan-4-yl)propyl methanesulfonate (A) 2,2-diisopropyl - 1,3 - dioxolane-4-propanol.—A rapidly stirred mixture of 26 g. of 1,2,5-pentane-triol, 40 ml. diisopropyl ketone and 100 ml. dry benzene containing 0.5 g. p-toluenesulfonic acid monohydrate was refluxed under a Dean-Stark trap for five hours. After neutralizing with NaOCH$_3$, the benzene was removed and the residue was distilled to give 2,2-diisopropyl-1,3-dioxolane-4-propanol, boiling at 85–94° C./0.2 mm., $n_D^{28}=1.4550$.

(B) 3-(2,2-diisopropyl-1,3-dioxolan-4-yl)propyl methanesulfonate.—Following the procedure described in preparation 2(B), 13.9 g. of 2,2-diisopropyl-1,3-dioxolane-4-propanol in 13 ml. of dry pyridine was allowed to react with 6.5 ml. of methanesulfonyl chloride to give 3-(2,2-diisopropyl-1,3-dioxolan-4-yl)propyl methanesulfonate.

(14) 4-(2,2-dimethyl-1,3-dioxolan-4-yl)butyl methanesulfonate

Following the procedure for preparation 2(B), 40 g. of 2,2-dimethyl-1,3-dioxolane-4-butanol in 43.4 g. dry pyridine was treated with 31.6 g. of methanesulfonyl chloride. There was obtained 50 g. of 4-(2,2-dimethyl-1,3-dioxolan-4-yl)butyl methanesulfonate.

(15) 6-(4-phenyl-1-piperazinyl)-1,2-hexanediol

A mixture of 56.5 g. of the crude 1-[4-(2,2-dimethyl-1,3-dioxolan-4-yl)-butyl]-4-phenylpiperazine free base obtained from the alternate procedure of Example 39 and 30 ml. concentrated HCl in 150 ml. methanol was refluxed for 15 minutes. Solvent was removed under reduced pressure on the steam bath, the residue was converted to the free base with 110 ml. of 15 percent NaOH and extracted three times with methylene chloride. After washing the organic phase three times with saturated NaCl solution, once with 200 ml. water, drying over MgSO$_4$ and removing the solvent, the residue was crystallized from ethyl acetate and pentane (1:2) to give 6-(4-phenyl-1-piperazinyl)-1,2-hexanediol, melting at 79–80.5° C.

*Analysis.*—Calculated for $C_{16}H_{26}N_2O_2$ (percent): C, 69.03; H, 9.41; N, 10.06. Found (percent): C, 68.79; H, 9.62; N, 9.89.

A crystalline citric acid salt may be obtained by mixing acetone solutions of equimolar quantities of the free base and citric acid, collecting the gummy precipitate and crystallizing from ethanol. The crystalline salt melts at 115–117° C.

*Analysis.*—Calculated for $C_{16}H_{26}N_2O_2 \cdot C_6H_8O_7$ (percent): C, 56.16; H, 7.28; N, 5.95. Found (percent): C, 56.41; H, 7.11; N, 5.89.

(16) 5-(2,2-dimethyl-1,3-dioxolan-4-yl)pentyl methanesulfonate (A) 1,2,7-heptanetriol.—After stirring a mixture of 20 g. $KBH_4$ and 15.7 g. dry LiCl in 250 ml. dry tetrahydrofuran for 15 minutes, a solution of 34 g. diethyl 2-hydroxypimelate in 50 ml. tetrahydrofuran was added in 30 minutes and the mixture was refluxed overnight. A solution of 14.5 g. HCl in 150 ml. methanol was added slowly with stirring, the mixture was distilled slowly, adding fresh methanol from time to time, until the distillate contained no methyl borate (as detected by burning a small portion of the distillate—the presence of methyl borate produces a green flame). The residual methanol was removed, the residue was suspended in isopropanol and filtered. The isopropanol was removed and the residue was dissolved in 60 ml. water and treated with 100 ml. of hot, 50 percent $K_2CO_3$ solution. The mixture was filtered, the filtrate evaporated to a slush, taken up in isopropanol, filtered and evaporated to dryness to give 1,2,7-heptanetriol, $n_D^{30} = 1.4695$.

(B) 2,2-dimethyl-1,3-dioxolane-4-pentanol.—Following the procedure for preparation 2(A), using 1,2,7-heptanetriol in place of 1,2,4-butanetriol, there was obtained 2,2-dimethyl-1,3-dioxolane-4-pentanol, boiling at 160–170°/17 mm., $n_D^{28} = 1.4495$.

*Analysis.*—Calculated for $C_{10}H_{20}O_3$ (percent): C, 63.80; H, 10.71. Found (percent): C, 63.62; H, 10.51.

(C) 5-(2,2-dimethyl-1,3-dioxolan-4-yl)pentyl methanesulfonate.—Following the procedure for Preparation 2B, using 2,2-dimethyl-1,3-dioxolane-4-pentanol in place of 2,2-dimethyl-1,3-dioxolane-4-ethanol, there was obtained 5-(2,2 - dimethyl-1,3-dioxolan-4-yl)pentyl methanesulfonate. The infrared spectrum is consistent with this structure.

(17) 7-(4-phenyl-1-piperazinyl)-1,2-heptanediol

A mixture of 5.3 g. of the product of Example 42 in 100 ml. 4 percent NaOH and 100 ml. ether was shaken, the ether solution was washed with NaCl solution and the ether removed. The residual oil was refluxed in 50 ml. of 1.2 N HCl for an hour, then cooled and rendered strongly basic with 40 percent NaOH. After extracting several times with methylene chloride and removing the solvent, the residual oil was taken up in a little isopropanol, diluted with water, and scratched to produce crystals of the desired product. These crystals were recrystallized from benzene-pentane to give 7-(4-phenyl-1-piperazinyl)-1,2-heptanediol, melting at 85–87.5° C.

*Analysis.*—Calculated for $C_{17}H_{28}N_2O_2$ (percent): C, 69.82; H, 9.65; N, 9.58. Found (percent): C, 70.06; H, 9.48; N, 9.79.

(18) 7,7-dipropoxytridecane

Prepared by the Lorette and Howard method using di-n-hexyl ketone in place of acetophenone, 7,7-dipropoxytridecane boils at 125–6° C./1 mm., $n_D^{25} = 1.4348$.

EXAMPLE 1

1-(2-ethyl-2-phenyl-1,3-dioxolan-4-yl-methyl)-4-phenylpiperazine hydrochloride, alpha racemate Into a mixture of 21 g. of the monohydrochloride salt of 3-(4-phenylpiperazinyl)-1,2-propanediol (preparation 1) and 26 g. of propiophenone dipropylacetal was passed anhydrous HCl until an excess was evident. The mixture was heated initially to 110° C., then maintained between 80 and 90° C. for four hours. Propanol was removed under reduced pressure and the residue was triturated with dry ether. The insoluble crystalline product was recrystallized from about 150 ml. ethanol to give 13.2 g. of the alpha racemate of 1-(2-ethyl-2-phenyl-1,3-dioxolan-4-yl-methyl)-4-phenylpiperazine hydrochloride, melting at 189° C.

*Analysis.*—Calculated for $C_{22}H_{28}N_2O_2 \cdot HCl$ (percent): C, 67.94; H, 7.52; N, 7.20. Found (percent): C, 67.77; H, 7.33; N, 7.36.

EXAMPLE 2

1-(2-ethyl-2-phenyl-1,3-dioxolan-4-ylmethyl)-4-phenylpiperazine hydrochloride, beta racemate A mixture of 43.6 g. of the dihydrochloride salt of 3-(4 - phenylpiperazinyl)-1,2-propanediol (preparation 1) and 65 g. of propiophenone dipropylacetal in 700 ml. n-propanol was refluxed for 2 hours, the solvent was removed, the residue was triturated three times with dry ether, then the insoluble solid was shaken in ether with an excess of 10% NaOH. The ethereal solution of the organic base was washed twice with water, dried over anhyrous $MgSO_4$ and the ether was removed to give 35.7 g. of an oily base. This was dissolved in 150 ml. ethanol and a solution of 9 g. of oxalic acid in 100 ml. ethanol was added, then 30 ml. ether, which induced the precipitation of a salt; this was filtered, washed with ethanol, then ether, and dried to give 28.5 g., decomposing at 183–184° C. The 28.5 g. oxalate salt was boiled in 800 ml. ethanol and the insolubles were filtered off to give 5.2 g., decomposing at 188–189° C. The cooled filtrate deposited 17.1 g., decomposing at 184–185° C. The filtrate was concentrated to 200 ml. and diluted with ether to give 3.7 g., decomposing at 167–173° C. From the filtrate obtained originally from the oxalate salt formation was obtained 4.6 g. more of the salt decomposing at 183–184° C. The three crops, 5.2 g., 17.1 g., and 4.6 g., were combined, converted to the free base, 21.4 g., dissolved in about 70 ml. isopropanol, neutralized with 4 N ethereal hydrogen chloride to about pH 5, and diluted with 200 ml. dry ether. After two days at room temperature, 18.6 g. of the HCl salt was obtained, M.P. 157–162° C. After two recrystallizations from isopropanol-ether (1:3), there was obtained 8.9 g. of the beta racemate of 1-(2-ethyl-2-phenyl - 1,3-dioxolan-4-ylmethyl)-4-phenylpiperazine hydrochloride, melting at 163.2–164.5° C.

*Analysis.*—Calculated for $C_{22}H_{28}N_2O_2 \cdot HCl$ (percent): C, 67.94; H, 7.52; N, 7.20. Found (percent): C, 67.66; H, 7.59; N, 7.41.

A thin layer chromatograph on the free bases of the alpha and beta racemates shows each to be essentially free of the other and to have significantly different $R_f$ values.

EXAMPLE 3

1 - (2 - ethyl-2-phenyl-1,3-dioxolan-4-ylmethyl)-4-phenyl piperazine hydrochloride, alpha racemate—alternate procedure A mixture of 9.7 g. of 4-chloromethyl-2-ethyl-2-phenyl-1,3-dioxolan (preparation 4) and 13 g. N-phenylpiperazine hydrochloride. The ether was removed and the residue was distilled at about 100° C./1.0 mm. to remove 10.6 g. starting materials. The residual oil was washed several times with water, taken up in 100 ml. ether, decanted from a small amount of dark insolubles, dried, and then neutralized with a propanol solution of HCl. The first precipitate of dark brown product clung to the flask, the nearly colorless solution was decanted and white crystals separated. This was recrystallized from a small volume of ethanol to give 1.8 g. of 1-(2-ethyl-2-phenyl-1,3-dioxolan - 4 - ylmethyl)-4-phenylpiperazine hydrochloride, melting at 193° C.

EXAMPLE 4

1-(2-ethyl-2-phenyl-1,3-dioxolan-4-ylmethyl)-4-phenylpiperazine methanesulfonate, alpha racemate A suspension of 8.5 g. of the product of Example I was shaken in ether with an excess of 10% NaOH; the ethereal solution was washed free al alkali, dried over anhydrous MgSO₄, and the ether was removed to give 7.8 g. of a colorless oil. This was dissolved in 50 ml. dry ether, a solution of 2.1 g. of methanesulfonic acid in 25 ml. dry ether and 4 ml. isopropanol was added. The precipitate was collected, washed with a 1:1 solution of ether-isopropanol, then ether, to give 9.3 g., M.P. 142–146° C. Recrystallized from isopropanol-ether to give 8.6 g. of 1 - (2-ethyl-2-phenyl-1,3-dioxolan-4-ylmethyl)-4-phenylpiperazine methanesulfonate, alpha racemate, melting at 158–159° C.

*Analysis.*—Calculated for $C_{22}H_{28}N_2O_2 \cdot CH_4O_3S$ (percent): C,61.59; H, 7.19; N, 6.25; Found (percent): C, 61.84; H, 7.43; N, 5.90.

EXAMPLE 5

1-(2,2-diphenyl-1,3-dioxolan-4-ylmethyl)-4-phenyl-piperazine hydrochloride

A mixture of 19.4 g. of 4-chloromethyl-2,2-diphenyl-1,3-dioxolane and 23 g. of N-phenylpiperazine was heated on the steam bath for 30 hours, then diluted with 200 ml. dry ether and filtered. The filtrate was neutralized with a solution of HCl in propanol, a precipitate formed which was recrystallized from a small volume of propanol, stirred in dry ether, and filtered to give 4.3 g. of 1(2,2-diphenyl-1,3-dioxolan-4-ylmethyl)-4-phenylpiperazine hydrochloride, melting at 201–203° C.

*Analysis.*—Calculated for $C_{26}H_{28}N_2O_2 \cdot HCl$ (percent): C, 71.46; H, 6.69; N, 6.41; Cl, 8.11. Found (percent): C, 71.17; H, 7.17; N, 6.83; Cl, 8.33.

EXAMPLE 6

1-[2-(2-ethyl-2-phenyl-1,3-dioxolan-4-yl)ethyl]-4-phenyl-piperazine maleate, alpha racemate A mixture of 7.1 g. of 4-′4-phenylpiperazinyl)-1,2-butanediol mono- and di-hydrochlorides obtained in preparation 2(C) was mixed in 50 ml. isopropanol with 8 g. of propiophenone dipropylacetal, about 1 ml. of 4 N ethereal HCl was added to bring the pH to about 2, and the mixture was refluxed for two hours. The solvent was removed under reduced pressure, the residue was washed washed with dry ether, and the crystalline product was shaken in fresh ether with excess 10% NaOH. The ethereal solution was washed twice with water, dried over anhydrous MgSO₄, and the ether was removed to give 7.9 g. oily base. This was dissolved in 20 ml. ethanol and a solution of 1.5 g. maleic acid in 10 ml. ethanol was added, followed by 100 ml. dry ether. The white crystalline product which formed was recrystallized twice from isopropropanol to give 4.5 g. of 1-[2-(2-ethyl-2-phenyl-1,3-dioxolan - 4-yl)ethyl]-4-phenylpiperazine maleate, the alpha racemate, melting at 165–166° C.

*Analysis.*—Calculated for $C_{23}H_{30}N_2O_2 \cdot C_4H_4O_4$ (percent): C, 67.20; H, 7.10; N, 5.81. Found (percent): C, 67.18; H, 7.14; N, 5.56.

EXAMPLE 7

1-[2-(2-ethyl-2-phenyl-1,3-dioxolan-4-yl)ethyl]-4-phenyl-piperazine maleate, alpha racemate, alternate procedure A mixture of 31.8 g. of 2 - (2 - ethyl-2-phenyl-1,3-dioxolan - 4-yl)ethyl methanesulfonate (from preparation 6(B)) and 34.4 g. of N-phenylpiperazine was heated on the steam bath for 45 minutes, cooled, the two-phase mixture was stirred with 200 ml. dry ether, and filtered. The crystalline solid was washed twice with ether. The combined ether solutions were evaporated and the residue was heated on the steam bath for two hours. Dilution with 1:1 hexane-ether precipitated a small amount of gummy material. After washing the organic solution with water and drying over anhydrous MgSO₄, the solvent was removed to give 38.4 g. amber oil. A solution of this oil in 100 ml. ethanol was mixed with a solution of 12.1 g. maleic acid in 50 ml. ethanol and after standing at room temperature overnight, obtained 24 g. white crystals, M.P. 150–155° C.

Two recrystallizations from isopropanol-methanol gave 18.1 g. of 1-[2-(2-ethyl-2-phenyl-1,3-dioxolan-4-yl)ethyl]-4-phenylpiperazine maleate, alpha racemate, melting at 166.0–166.8° C.

EXAMPLE 8

1-[2-(2-ethyl-2-phenyl-1,3-dioxolan-4-yl)ethyl]-4-phenyl-piperazine methanesulfonate, alpha racemate The 18.1 g. of the maleate salt (Example 7) was converted to the free base with 10% NaOH to give 13.7 g. of colorless oil which was dissolved in 100 ml. dry ether and mixed with a solution of 3.6 g. methanesulfonic acid in 40 ml. dry ether and 6 ml. isopropanol. The white precipitate was collected and recrystallized twice from isopropanol to give 10.4 g. of 1-[2-(2-ethyl-2-phenyl-1,3-dioxolan - 4-yl)ethyl]-4-phenylpiperazine methanesulfonate, alpha racemate, melting at 185.3–186.1° C.

*Analysis.*—Calculated for $C_{23}H_{30}N_2O_2 \cdot CH_4O_3S$ (percent): C, 62.31; H, 7.41; N, 6.06. Found (percent): C, 62.53; H, 7.24; N, 6.26.

EXAMPLE 9

1-[2-(2-ethyl-2-phenyl-1,3-dioxolan-4-yl)ethyl]-4-phenyl-piperazine maleate, beta racemate The mother liquor, from which the 24 g. of crude maleate salt was separated in Example 7, was evaporated to dryness under reduced pressure, the residue was washed with dry ether, then stirred in 200 ml. water, dried, dissolved in about 70 ml. hot acetone, from which separated 0.3 g. of the maleate salt of the alpha racemate. The acetone was removed, the residue was converted to the free base to give 11.2 g. of an oil. This was separated on a 1½ inch chromatographic column containing 600 g. of silica gel (Baker 3405) using benzene as a solvent. After allowing 500 ml. of benzene to flow through the column at a rate of 25 ml./6 minutes, 10% v./v. of ethyl acetate-benzene was used as the eluting solvent, collecting 25 ml. fractions every six minutes. Thin layer chromatographs (silica gel plates, 1:1 ethyl acetate—benzene developing solvent—iodine detection) were obtained on every tenth collection and those fractions near the end of a 200 fraction collection which showed essentially only one spot, were combined and evaporated. The residual oil was taken up in about 20 ml. dry ether and an ethereal solution of maleic acid was added slowly until the pH was about 5. The precipitated salt was recrystallized three times from isopropanol to give 1.7 g. of 1-[2-(2-ethyl-2-phenyl-1,3-dioxolan - 4 - yl)ethyl]-4-phenylpiperazine maleate, beta racemate, melting at 150–153° C.

*Analysis.*—Calculated for $C_{23}H_{30}N_2O_2 \cdot C_4H_4O_4$ (percent): C, 67.20; H, 7.10; N, 5.81. Found (percent): C, 66.94; H, 7.39; N, 5.99.

EXAMPLE 10

(+)-1-[2-(2-ethyl-2-phenyl-1,3-dioxolan-4-yl)ethyl]-4-phenylpiperazine maleate, from the alpha racemate A mixture of 14.5 g. of 2-(2-ethyl-2-phenyl-1,3-dioxolan-4-yl)ethyl methanesulfonate (preparation 7 (C)) and 16 g. N-phenylpiperazine was allowed to react and the product converted to the maleate salt according to the procedure described in Example 7. Two recrystallizations from methanol-isopropanol (1:1) gave 7.4 g. of (+)-1-[2 - (2 - ethyl-2-phenyl-1,3-dioxolan-4-yl)ethyl]-4-phenylpiperazine maleate, from alpha racemate, melting at 166–168°, $\alpha_D^{25} = +11.1°$ (c.=1.92 in $CHCl_3$).

*Analysis.*—Calculated for $C_{23}H_{30}N_2O_2 \cdot C_4H_4O_4$ (percent): C, 67.20; H, 7.10; N, 5.81. Found (percent): C, 67.32; H, 6.99; N, 5.74.

EXAMPLE 11

(+) - 1 - [2-(2-ethyl-2-phenyl-1,3-dioxolan-4-yl)ethyl]-4-phenylpiperazine methanesulfonate, from the alpha racemate Four and four-tenths grams of the maleate salt (Example 10) was converted to 3.27 g. of the free base with 10% NaOH. $\alpha_D^{25} = +30.5$ (c.=1.95 in methanol). Three grams of the base in 40 ml. dry ether was mixed with a solution of 0.79 g. of methanesulfonic acid in 20 ml. dry ether. The precipitated solid was recrystallized from isopropanol-ether to give 3.26 g. of (+)-1-[2-(2-ethyl-2-phenyl-1,3-dioxolan-4-yl)ethyl]-4-phenylpiperazine methanesulfonate, from the alpha racemate, melting at 135–137° C., $\alpha_D^{25} = +26.8°$ (c.=1.86 in methanol).

*Analysis.*—Calculated for $C_{23}H_{30}N_2O_2 \cdot CH_4O_3S \cdot \frac{1}{2}H_2O$ (percent): C, 61.12; H, 7.48; N, 5.94. Found (percent): C, 60.9; H, 7.6; N, 5.9.

EXAMPLE 12

(—) - 1 - [2-(2-ethyl-2-phenyl-1,3-dioxolan-4-yl)ethyl]-4-phenylpiperazine maleate (from alpha racemate)

A mixture of 12 g. of 2-(2-ethyl-2-phenyl-1,3-dioxolan-4-yl)ethyl methanesulfonate (preparation 8 (C)) and 13 g. of N-phenylpiperazine was allowed to react and the product converted to the maleate salt according to the procedure described in Example 7. Two recrystallizations from ethanol gave 6.58 g. of (—)-1-[2-(2-ethyl-2-phenyl-1,3-dioxolan-4-yl)ethyl]-4-phenylpiperazine maleate, from alpha racemate, melting at 166–167.5° C., $\alpha_D^{25} = -11.3°$ (c.=1.89 in CHCl$_3$).

*Analysis.*—Calculated for $C_{23}H_{30}N_2O_2 \cdot C_4H_4O_4$ (percent): C, 67.20; H, 7.10; N, 5.81. Found (percent): C, 67.04; H, 6.98; N, 5.74.

EXAMPLE 13

(—) - 1 - [2 - (2 - ethyl - 2 - phenyl - 1,3-dioxolan-4-yl)ethyl]4-phenylpiperazine methanesulfonate (from alpha racemate)

By the procedure of Example 11, 3.78 g. of the maleate salt (from Example 12) was converted to the free base [$\alpha_D^{25} = -30.5°$ (c.=1.94 in methanol)] and subsequently to 2.53 g. of (—)-1-[2-(2-ethyl-2-phenyl-,3-dioxolan-4-yl)ethyl]-4-phenylpiperazine methanesulfonate, from alpha racemate, crystals from ether-isopropanol (6:1), melting at 135.5–138° C., $\alpha_D^{25} = -25.5°$ (c.=1.89 in methanol).

*Analysis.*—Calculated for $C_{23}H_{30}N_2O_2 \cdot CH_4O_3S \cdot H_2O$ (percent): C, 59.98; H, 7.55; N, 5.83. Found (percent): C, 59.90; H, 7.43; N, 6.01.

EXAMPLE 14

(+) - 1 - [2 - (2 - ethyl-2-phenyl-1,3-dioxolan-4-yl)ethyl] - 4 - phenylpiperazine maleate (from the beta racemate)

A repeat of a larger preparation of the product of Example 12 was made and after removal of pure maleate salt of the levorotatory isomer, the mother liquors were combined and evaporated to dryness. The residue was converted to the free base with 10% NaOH to give 14 g. of a mixture of alpha (—) and beta (+) isomers. This was placed on a 4 cm. column packed with 500 g. of 30–70 mesh Brinkmann silica gel in benzene and the isomers were separated according to the procedure described in Example 9. The final eluates contained the pure dextrorotatory isomer of the beta racemate of 1-[2-(2-ethyl-2 - phenyl-1,3-dioxolan-4-yl)ethyl]-4-phenylpiperazine. A portion of the oily free base obtained after evaporation of these final eluates was dissolved in ethanol and treated with an equivalent of maleic acid dissolved in ethanol and ether. The maleate salt was obtained, melting at 161–164° C., $\alpha_D^{25} = +37.2°$ (c.=2.61 in CHCl$_3$).

*Analysis.*—Calculated for $C_{23}H_{30}N_2O_2 \cdot C_4H_4O_4$ (percent): C, 67.20; H, 7.10; N, 5.81. Found (percent): C, 67.37; H, 7.26; N, 5.92.

EXAMPLE 15

(+) - 1 - [2 - (2 - ethyl - 2 - phenyl-1,3-dioxolan-4-yl)ethyl]-4-phenylpiperazine methanesulfonate monohydrate (from the beta racemate)

A portion of the pure dextrorotatory isomer of the beta racemate in the free base form, as obtained in the procedure of Example 14, was treated with an equivalent of methanesulfonic acid in anhydrous ether and the precipitate was recrystallized from isopropanol-ether to give the dextrorotatory isomer of the beta racemate of 1-[2-(2 - ethyl - 2 - phenyl-1,3-dioxolan-4-yl)ethyl]-4-phenylpiperazine methanesulfonate monohydrate, melting at 113–115° C., $\alpha_D^{25} = +37.4°$ (c.=1.38 in methanol).

*Analysis.*—Calculated for $C_{23}H_{30}N_2O_2 \cdot CH_4O_3S \cdot H_2O$ (percent): C, 59.98; H, 7.55; N, 5.83. Found (percent) C, 60.43; H, 7.82; N, 5.92.

EXAMPLE 16

(—) - 1 - [2 - (2 - ethyl - 2 - phenyl-1,3-dioxolan-4-yl)ethyl] - 4-phenylpiperazine maleate (from the beta racemate)

Following the chromatographic procedure of Example 14 but using the mixture of alpha (+) and beta (—) isomers isolated from the mother liquors of Example 11, there was obtained essentially pure beta (—) isomer in the final eluates. These were evaporated and a portion of the oily base was treated with maleic acid to give the levorotatory isomer of the beta racemate of 1 - [2 - (2-ethyl - 2 - phenyl - 1,3-dioxolan-4-yl)ethyl]-4-phenylpiperazine maleate, melting at 161–163° C., $\alpha_D^{25} = -38.4°$ (c.=1.76 in CHCl$_3$).

*Analysis.*—Calculated for $C_{23}H_{30}N_2O_2 \cdot C_4H_4O_4$ (percent): C, 67.20; H, 7.10; N, 5.81. Found (percent): C, 66.88; H, 7.50; N, 6.20.

EXAMPLE 17

(—) - 1 - [2 - (2 - ethyl-2-phenyl-1,3-dioxolan-4-yl) ethyl] - 4-phenylpiperazine methanesulfonate monohydrate from the beta racemate A portion of the levorotatory isomer of the beta racemate in the free base form as obtained in the procedure of Example 16, was treated with an equivalent of methanesulfonic acid in anhydrous ether to give the levorotatory isomer of the beta racemate of 1-[2-(2-ethyl-2-phenyl-1,3 - dioxolan - 4-yl)ethyl]-4-phenylpiperazine methanesulfonate monohydrate, melting at 113–116° C., $\alpha_D^{25} = -37.3°$ (c.=1.38 in methanol).

*Analysis.*—Calculated for $C_{23}H_{30}N_2O_2 \cdot CH_4O_3S \cdot H_2O$ (percent): C, 59.98; H, 7.55; N, 5.83. Found (percent): C, 60.28; H, 7.65; N, 6.01.

EXAMPLE 18

1-[2-(2-ethyl-2-phenyl-1,3-dioxolan-4-yl)ethyl]-4-(3-trifluoromethylphenyl)-piperazine maleate By the procedure of Example 7, using N-($\alpha,\alpha,\alpha$-trifluoro-m-tolyl)piperazine in place of N-phenylpiperazine, the ethersoluble reaction mixture was first distilled at <1.0 mm. to remove any unreacted piperazine starting material, the pot residue was then treated with an equivalent of maleic acid and the resulting salt was recrystallized from isopropanol to give an alpha and beta racemate mixture of 1-[2-(2-ethyl-2-phenyl-1,3-dioxolan-4-yl)ethyl] - 4-(3-trifluoromethylphenyl)piperazine maleate, melting at 155–157° C.

*Analysis.*—Calculated for $C_{24}H_{29}F_3N_2O_2 \cdot C_4H_4O_4$ (percent): C, 61.08; H, 6.04; N, 5.09. Found (percent): C, 61.04; H, 6.13; N, 5.04.

EXAMPLE 19

1-[2-(2-ethyl-2-phenyl-1,3-dioxolan-4-yl)ethyl]-4-(4-methoxyphenyl)piperazine maleate By the procedure of Example 18, using N-(4-methoxyphenyl)piperazine in place of N-($\alpha,\alpha,\alpha$-trifluoro-m-tolyl) piperazine, there was obtained an alpha and beta racemate mixture of 1 - [2 - (2-ethyl-2-phenyl-1,3-dioxolan-4-yl) ethyl]-4-(4-methoxyphenyl)piperazine maleate, melting at 144–147° C.

*Analysis.*—Calculated for $C_{24}H_{32}N_2O_3 \cdot C_4H_4O_4$ (percent): C, 65.61; H, 7.08; N, 5.47. Found (percent): C, 65.72; H, 6.92; N, 5.55.

EXAMPLE 20

1-[2-(2-ethyl-2-phenyl-1,3-dioxolan-4-yl)ethyl]-4-(4-chlorophenyl)piperazine hydrochloride By the procedure of Example 18, using N-(4-chlorophenyl)piperazine in place of N-($\alpha,\alpha,\alpha$-trifluoro-m-tolyl)piperazine, there was obtained an alpha and beta racemate mixture of 1-[2-(2-ethyl-2-phenyl-1,3-dioxolan-4-yl)ethyl]-4-(4-chlorophenyl)piperazine maleate, melting at 147.5–150° C. This was converted to the free base, dissolved in isopropanol, and one equivalent of hydrogen chloride in ether was added to give 1-[2-(2-ethyl-2-phenyl-1,3 - dioxolan-4-yl)-ethyl]-4-(4-chlorophenyl)piperazine hydrochloride, melting at 170–173° C.

*Analysis.*—Calculated for $C_{23}H_{29}ClN_2O_2 \cdot HCl$ (percent): C, 63.15; H, 6.91; N, 6.41. Found (percent) C, 62.98; H, 6.99; N, 6.57.

EXAMPLE 21

1-[2-(2,2-diphenyl-1,3-dioxolan-4-yl)ethyl]-4-phenylpiperazine

A mixture of 102 g. of benzophenone dimethylacetal, 43 g. of 1,2,4-butanetriol and 2 g. p-toluenesulfonic acid in 100 ml. dry benzene and 3 ml. ethanol was refluxed with stirring for about 20 minutes. The acid was neutralized with sodium methoxide, about 300 ml. ether was added and the mixture was washed successively three times with water, dilute NaHCO$_3$ solution, saturated NaCl solution and dried over MgSO$_4$. The solvent was removed and the residue was distilled at 0.5 mm. to remove benzophenone and excess acetal. The pot residue, $n_D^{28}$=1.5821, weighing 92.5 g., was treated at −20° C. in 80 ml. dry pyridine with 32 ml. of methanesulfonyl chloride, stirred at −20° C. to −10° for 30 minutes and then allowed to come to room temperature over the next hour. The mixture was taken up in ether, washed successively with cold, dilute NH$_4$OH, cold 1% HCl, dilute NH$_4$OH, water and then dried over MgSO$_4$. Removal of solvent gave crude 1 - [2 - (2,2 - diphenyl - 1,3-dioxolan-4-yl)ethyl]methanesulfonate, $n_D^{28}$=1.5647.

A mixture of 60 g. of the above sulfonate ester and 56 g. of N-phenyl piperazine was heated to 165° C. in 45 minutes, allowed to cool to room temperature, taken up in ether, washed repeatedly with water and then dried over MgSO$_4$. Excess phenylpiperazine was removed by distillation at 0.5 mm., the pot residue was taken up in dry ether and neutralized with oxalic acid in isopropanol. The precipitated oxalate salt was washed with ether, then converted to the free base in ether with 10% NaOH and dried over MgSO$_4$. Dilution with pentane produced crystals which were recrystallized from ether-pentane to give 1-[2-(2,2-diphenyl-1,3-dioxolan-4-yl)ethyl]-4-phenyl-piperazine, melting at 101–106° C.

*Analysis.*—Calculated for $C_{27}H_{30}N_2O_2$ (percent): C, 78.23; H, 7.30; N, 6.76. Found (percent): C, 77.74; H, 7.67; N, 6.97.

EXAMPLE 22

1-[3-(2-ethyl - 2 - phenyl-1,3-dioxolan-4-yl)propyl] 4-phenylpiperazine maleate, alpha racemate and beta racemate A mixture of 21.1 g. of 5-(4-phenylpiperazinyl)-1,2-pentanediol dihydrochloride (preparation 3(C)) was 35 g. of propiophenone dipropylacetal in 300 ml. propanol was refluxed for two hours, the solvent was removed under reduced pressure and the residue was washed with dry ether. The insoluble residue was converted to the free base in ether by shaking with an excess of 10% NaOH, washed twice with water, dried over MgSO$_4$, and the ether was removed. The residual oil was dissolved in 100 ml. ethanol, a solution of 5.6 g. oxalic acid in 50 ml. ethanol was added, and the precipitated salt was collected and washed with ethanol and ether to give 19.2 g. melting at 157–161°. Recrystallization from ethanol gave 17 g., melting at 161.5–163° C. This was converted to 13.4 g. of the free base which was dissolved in isopropanol and acidified to pH 5 with 3 N ethereal HCl. Diluting with a little dry ether gave 12.1 g., melting at 182.5–184.2° C. Recrystallization from methanol-isopropanol gave 11.2 g. of 1-[3-(2-ethyl-2-phenyl-1,3-dioxolan-4-yl)propyl]-4-phenylpiperazine hydrochloride, melting at 181.0–182.4° C.

*Analysis.*—Calculated for $C_{24}H_{32}N_2O_2 \cdot HCl$ (percent): C, 69.13; H, 7.98; N, 6.72. Found (percent): C, 69.21; H, 7.91; N, 6.96.

The thin layer chromatograph (TLC) on a small sample of base obtained from the HCL salt showed about a 60–40 mixture of racemates.

Ten grams of the above racemate mixture was converted to 9.2 g. of the free base. This was chromatographed as described in the procedure of Example 9. The first 8500 ml. of eluate contained nothing, the next 7500 ml. contained the alpha racemate (by TLC), the next 6000 ml. contained the racemate mixture, and the final 4000 ml. contained the beta racemate. The fractions containing the separate racemates were evaporated to dryness and their respective maleate salts prepared using appropriate equivalent amounts of maleic acid in isopropanol. The alpha racemate of 1-[3-(2-ethyl-2-phenyl-1,3-dioxolan-4-yl)propyl]-4-phenylpiperazine maleate melted at 118–120° C.

*Analysis.*—Calculated for $C_{24}H_{32}N_2O_2 \cdot C_4H_4O_4$ (percent): C, 67.72; H, 7.31; N, 5.64. Found (percent): C, 67.87; H, 7.94; N, 5.78.

The beta racemate of 1-[3-(2-ethyl-2-phenyl-1,3-dioxolan-4-yl)propyl]-4-phenyl-piperazine maleate melted at 101–103° C.

*Analysis.*—Calculated for $C_{24}H_{32}N_2O_2 \cdot C_4H_4O_4$ (percent) C, 67.72; H, 7.31, N, 5.64. Found (percent): C, 67.49; H, 7.71; N, 6.08.

EXAMPLE 23

1-[4-(2-ethyl-2-phenyl-1,3-dioxolan-4-yl)butyl]-4-phenyl-piperazine maleate, alpha racemate and beta racemate A mixture of 78.8 g. of 4-(2-ethyl-2-phenyl-1,3-dioxolan-4-yl)butyl methanesulfonate (preparation 9) and 79.5 g. of N-phenylpiperazine was allowed to react and the crude free base of the product was isolated as described in the procedure for Example 7. A portion, 18 g., was chromatographed as described in the procedure of Example 9, except that the concentration of ethyl acetate was changed from 10% to 15% when it appeared elution was much too slow to be reasonable. This was done prior to the elution of the alpha racemate. Elution was continued until fractions containing only pure alpha and pure beta racemates were obtained. The respective maleate salts were prepared and recrystallized from ethanol. The alpha racemate of 1-[4-(2-ethyl-2-phenyl-1,3-dioxolan-4-yl) butyl]-4-phenyl-piperazine maleate melted at 146–149° C.

*Analysis.*—Calculated for $C_{25}H_{34}N_2O_2 \cdot C_4H_4O_4$ (percent): C, 68.21; H, 7.50; N, 5.49. Found (percent): C, 68.39; H, 7.36; N, 5.52.

The beta racemate of 1-[4-(2-ethyl-2-phenyl-1,3-dioxolan-4-yl)butyl]-4-phenyl-piperazine maleate melted at 109.5–114.5° C.

*Analysis.*—Calculated for $C_{25}H_{34}N_2O_2 \cdot C_4H_4O_4$ (percent): C, 68.21; H, 7.50; N, 5.49. Found (percent): C, 68.23; H, 7.65; N, 5.63.

EXAMPLE 24

1-(1,3-dioxolan-4-ylmethyl)-4-phenylpiperazine maleate

A mixture of 12.3 g. of 4-chloromethyl-1,3-dioxolane and 33 g. of N-phenylpiperazine was heated at 150° C. for a few minutes at which time an exothermic reaction took place and the mixture was cooled quickly with an ice bath. The oily crystalline mass was stirred with anhydrous ether, the ether solution was washed with water, then dried over MgSO$_4$ and the ether removed. The residue was distilled at about 0.1 mm., collecting the material boiling up to 137° C. The pot residue was then cooled, dissolved in 20 ml. ethanol, and 4 g. maleic acid in 10 ml. ethanol was added. Dilution with ether produced a tan solid which was recrystallized from ethanol and ether to give 1-(1,3-dioxolan-4-ylmethyl)-4-phenylpiperazine maleate, melting at 164–167° C.

*Analysis.*—Calculated for $C_{14}H_{20}N_2O_2 \cdot C_4H_4O_4$ (percent): C, 59.33; H, 6.64; N, 7.69. Found (percent): C, 59.22; H, 6.47; N, 7.49.

EXAMPLE 25

1-(2,2-dimethyl-1,3-dioxolan-4-ylmethyl)-4-phenylpiperazine maleate

A solution of 10 g. of 3-(4-phenylpiperazinyl)-1,2-propanediol dihydrochloride (preparation 1) and 25 ml. of 2,2-dimethoxypropane in 150 ml. n-propanol was acidified with hydrogen chloride and refluxed four hours. The solvent was removed and the residual oil was shaken in ether with 10% NaOH, the ether solution was washed with saturated NaCl solution, dried over MgSO$_4$, and the ether was removed. The residual oil was dissolved in 30 ml. ethanol, 3.8 g. of maleic acid in 10 ml. ethanol was added, and dilution with ether produced crystals which were recrystallized from ethanol-ether (1:1) to give 1-(2,2 - dimethyl-1,3-dioxolan-4-ylmethyl)-4-phenylpiperazine maleate, melting at 172–174° C.

*Analysis.*—Calculated for $C_{16}H_{24}N_2O_2 \cdot C_4H_4O_4$ (percent): C, 61.21; H, 7.19; N, 7.14. Found (percent): C, 61.02; H, 7.07; N, 7.29.

EXAMPLE 26

1-(2,2-diethyl-1,3-dioxolan-4-ylmethyl)-4-phenylpiperazine maleate

By the procedure of Example 25, using 3,3-dipropoxypentane (preparation 10) in place of 2,2-dimethoxypropane, the free base obtained after the alkali treatment was distilled, collecting the fraction boiling at 153–156°/0.15 mm. This was converted to the maleate salts and recrystallization from isopropanol-ether (1:1) gave 1-(2,2-diethyl-1,3-dioxolan - 4 - ylmethyl) - 4 - phenylpiperazine maleate, melting at 107–111.5° C.

*Analysis.*—Calculated for $C_{18}H_{28}N_2O_2 \cdot C_4H_4O_4$ (percent): C, 62.84; H, 7.67; N, 6.66. Found (percent): C, 62.89; H, 7.58; N, 6.85.

EXAMPLE 27

1-(2,2-diisopropyl-1,3-dioxolan-4-ylmethyl)-4-phenylpiperazine hydrochloride

A mixture of 41 g. of 2,2-diisopropyl-4-chloromethyl-1,3-dioxolane and 65 g. of N-phenylpiperazine was heated at 220° C. for ten minutes, cooled, and the reaction mixture was stirred with ether, filtering off the crystalline N-phenylpiperazine hydrochloride. The ether solution was washed with water, evaporated, and the residual oil was distilled, collecting the fraction boiling at 167–170° C./0.2 mm. An equivalent of hydrogen chloride in ethanol was added to this fraction and dilution with dry ether gave 1 - (2,2-diisopropyl-1,3-dioxolan-4-ylmethyl)-4-phenylpiperazine hydrochloride, melting at 162–164.5° C.

*Analysis.*—Calculated for $C_{20}H_{32}N_2O_2 \cdot HCl$ (percent): C, 65.11; H, 9.02; N, 9.61. Found (percent): C, 65.09; H, 8.87; N, 9.66.

EXAMPLE 28

1-(2,2-dipropyl-1,3-dioxolan-4-ylmethyl)-4-phenylpiperazine maleate

By the procedure of Example 25, using 4,4-dipropoxyheptane (preparation 11) in place of 2,2-dimethoxy propane, there was obtained 1-(2,2-dipropyl-1,3-dioxolan-4-ylmethyl)-4-phenylpiperazine maleate, melting at 106–109° C.

*Analysis.*—Calculated for $C_{20}H_{32}N_2O_2 \cdot C_4H_4O_4$ (percent): C, 64.26; H, 8.09; N, 6.25. Found (percent): C, 64.27; H, 7.98; N, 6.44.

EXAMPLE 29

1-[2-(2-methyl-1,3-dioxolan-4-yl)ethyl]-4-phenylpiperazine maleate

A solution of 10.4 g. of 4-(4-phenylpiperazinyl)-1,2-butanediol dihydrochloride (preparation 2(C)) and 26 ml. acetal in 100 ml. isopropanol containing an excess of hydrogen chloride was refluxed about 16 hours. The solvent was removed and the residue was shaken in ether with 10% NaOH, then water, and finally with saturated NaCl solution. After drying the ether solution over MgSO$_4$, the ether was removed and the oily residue was distilled, collecting 4.6 g. boiling in the range 162–180°/0.2–0.35 mm. This was dissolved in 130 ml. ether and 1.9 g. maleic acid in 15 ml. ethanol was added. A white solid separated which was recrystallized from ethanol-ether (1:4) to give 1 - [2-(2-methyl-1,3-dioxolan-4-yl)ethyl]-4-phenylpiperazine maleate, melting at 131.5–140.5° C.

*Analysis.*—Calculated for $C_{16}H_{24}N_2O_2 \cdot C_4H_4O_4$ (percent): C, 61.21; H, 7.19; N, 7.14. Found (percent): C, 61.07; H, 6.99; N, 7.21.

EXAMPLE 30

1-[2-(2,2-dimethyl-1,3-dioxolan-4-yl)ethyl]-4-phenylpiperazine hydrochloride

A mixture of 16.6 g. of 2-(2,2-dimethyl-1,3-dioxolan-4-yl)ethyl methanesulfonate (preparation 2(B)) and 24 g. of 1-phenylpiperazine was heated on the steam bath. The temperature rose to 110° and two phases formed. Heating at 105° was continued for 30 minutes, the mixture was cooled and triturated with dry ether. The tan crystalline solid which formed was washed repeatedly with dry ether, the ether extracts were combined and the ether was removed. The oily residue was dissolved in about 100 ml. isopropanol and neutralized with 4 N ethereal hydrogen chloride to about pH 4. Standing at room temperature, 14.7 g. of white crystals was obtained, M.P. 203–9°. Recrystallization from isopropanol gave 11.6 g. of 1-[2-(2,2-dimethyl-1,3-dioxolan-4-yl)ethyl] - 4 - phenylpiperazine hydrochloride, melting at 208.5–210.5° C.

*Analysis.*—Calc'd for $C_{17}H_{26}N_2O_2 \cdot HCl$ (percent): C, 62.47; H, 8.33; N, 8.57. Found (percent): C, 61.99; H, 8.85; N, 8.76.

EXAMPLE 31

1-[2-(2,2-diethyl-1,3-dioxolan-4-yl)ethyl]-4-phenylpiperazine maleate

A mixture of 56 g. of 1,2,4-butanetriol, 60 g. of 3-pentanone, 2 g. of p-toluenesulfonic acid, and 100 ml. benzene was stirred vigorously and refluxed for three hours or until no more water could be collected. The mixture was neutralized with NaOCH$_3$, filtered, and distilled, collecting the fraction boiling at 125–132°/15.6 mm., $n_D^{29}$=1.4452. The 2,2-diethyl-1,3-dioxolane-4-ethanol thus obtained was converted to 2-(2,2-diethyl-1,3-dioxolan-4-yl)ethyl methanesulfonate, $n_D^{29}$=1.4570, by the procedure described in preparation 2(B). Treatment with N-phenylpiperazine as described in the procedure of Example 30 to the free base stage and conversion to a salt with maleic acid gave 1 - [2 - (2,2 - diethyl-1,3-dioxolan-4-yl)ethyl]-4-phenylpiperazine maleate, crystals from isopropanol, melting at 141.1–142.1° C.

*Analysis.*—Calculated for $C_{19}H_{30}N_2O_2 \cdot C_4H_4O_4$ (percent): C, 63.57; H, 7.89; N, 6.45. Found (percent): C, 63.53; H, 8.05; N, 6.61.

EXAMPLE 32

1-[2-(2,2-diisopropyl-1,3-dioxolan-4-yl)ethyl]-4-phenylpiperazine hydrochloride

Using di-isopropyl ketone in place of 3-pentanone in the procedure of Example 31, the first intermediate, 2,2-diisopropyl-1,3-dioxolane-4-ethanol, was obtained, boiling at 135–144°/14.5 mm., $n_D^{28}$=1.4535; the second intermediate, 2-(2,2-diisopropyl-1,3-dioxolan-4-yl)ethyl methanesulfonate, had a refraction index at 29° of 1.4590; the reaction with N-phenylpiperazine gave a base which was neutralized in isopropanol with ethereal HCl and the salt recrystallized from isopropanol to give 1-[2-(2,2-diisopropyl-1,3-dioxolan-4-yl)ethyl]-4-phenylpiperazine hydrochloride, melting at 210–211° C.

*Analysis.*—Calculated for $C_{21}H_{34}N_2O_2 \cdot HCl$ (percent): C, 65.86; H, 9.21; N, 7.32. Found (percent): C, 65.81; H, 9.11; N, 7.43.

EXAMPLE 33

1-[2-(2,2-dipropyl-1,3-dioxolan-4-yl)ethyl]-4-phenylpiperazine maleate

A mixture of 16.2 g. of 4-(4-phenylpiperazinyl)-1,2-butanediol dihydrochloride (preparation 2(C)) and 16.2 g. 4,4-dipropoxyheptane (preparation 11) in 150 ml. n-propanol acidified with hydrogen chloride was refluxed for an hour. The solvent was removed, the residue was mixed with excess 10% NaOH solution and extracted with ether. The ether solution was washed three times with water, dried over $MgSO_4$, and the ether was removed. A solution of the residue in 25 ml. ethanol was treated with 5.1 g. maleic acid in 50 ml. ethanol and diluted with 125 ml. ether to give white crystals. Recrystallization from ethanol-ether (1:2) gave 1-[2-(2,2-dipropyl-1,3-dioxolan-4-yl)ethyl]-4-phenylpiperazine maleate, melting at 139.5–142° C.

*Analysis.*—Calculated for $C_{21}H_{34}N_2O_2 \cdot C_4H_4O_4$ (percent): C, 64.91; H, 8.28; N, 6.06. Found (percent): C, 64.73; H, 8.37; N, 6.05.

EXAMPLE 34

1-[2-(2,2-dibutyl-1,3-dioxolan-4-yl)ethyl]-4-phenylpiperazine maleate

By the procedure of Example 33, using 5,5-dipropoxynonane (preparation 12) in place of 4,4-dipropoxyheptane, 1-[2-(2,2-dibutyl-1,3-dioxolan-4-yl)ethyl]-4-phenylpiperazine maleate was obtained, melting at 120–121° C.

*Analysis.*—Calculated for $C_{23}H_{38}N_2O_2 \cdot C_4H_4O_4$ (percent): C, 66.10; H, 8.63; N, 5.71. Found (percent): C, 65.98; H, 8.41; N, 5.81.

EXAMPLE 35

1-[3-(2,2-dimethyl-1,3-dioxolan-4-yl)propyl]-4-phenylpiperazine maleate

A mixture of 44.6 g. of 3-(2,2-dimethyl-1,3-dioxolan-4-yl)propyl methanesulfonate (preparation 3(B)) and 61.6 g. of N-phenylpiperazine was heated on the steam bath for 14 hours, cooled, and stirred with ether. The ether solution was evaporated and the residue was distilled, collecting the fraction boiling at 150–155°/0.1 mm. This was dissolved in isopropanol, and a molar equivalent of maleic acid dissolved in isopropanol was added. The product which separated was recrystallized from ethanol to give 1-[3-(2,2-dimethyl-1,3-dioxolan-4-yl)-propyl]-4-phenylpiperazine maleate, melting at 134–136.5° C.

*Analysis.*—Calculated for $C_{18}H_{28}N_2O_2 \cdot C_4H_4O_4$ (percent): C, 62.84; H, 7.67; N, 6.66. Found (percent): C, 62.68; H, 7.61; N, 6.82.

EXAMPLE 36

1-[3-(2,2-diethyl-1,3-dioxolan-4-yl)propyl]-4-phenylpiperazine maleate

A mixture of 12.5 g. of 5-(4-phenylpiperazinyl)-1,2-pentanediol dihydrochloride (preparation 3(C)) and 10.4 g. of 3,3-dipropoxypentane (preparation 10) in 85 ml. n-propanol acidified with hydrogen chloride was refluxed one hour, 5 g. $NaOCH_3$ was added, and the solvent was removed. The residue was dissolved in ether and washed with water, then saturated NaCl solution, and dried over $MgSO_4$. The ether was removed to give an oily residue, 13.8 g., which was dissolved in 10 ml. ether and mixed with 4.3 g. maleic acid dissolved in 10 ml. isopropanol. The product obtained was recrystallized from isopropanol-ether (1:1) to give 1-[3-(2,2-diethyl-1,3-dioxolan-4-yl)propyl]-4-phenylpiperazine maleate, melting at 109–111.5° C.

*Analysis.*—Calculated for $C_{20}H_{32}N_2O_2 \cdot C_4H_4O_4$ (percent): C, 64.27; H, 8.09; N, 6.25. Found (percent): C, 64.35; H, 8.02; N, 6.22.

EXAMPLE 37

1-[3-(2,2-diisopropyl-1,3-dioxolan-4-yl)propyl]-4-phenylpiperazine maleate

By the procedure of Example 35, using 3-(2,2-diisopropyl-1,3-dioxolan-4-yl)propyl methanesulfonate (preparation 13(B)) in place of 3-(2,2-dimethyl-1,3-dioxolan-4-yl)propyl methanesulfonate, 1-[3-(2,2-diisopropyl-1,3-dioxolan-4-yl)propyl]-4-phenylpiperazine maleate was obtained, melting at 114.5–118° C.

*Analysis.*—Calculated for $C_{22}H_{36}N_2O_2 \cdot C_4H_4O_4$ (percent): C, 65.52; H, 8.46; N, 5.88. Found (percent): C, 65.67; H, 8.64; N, 6.12.

EXAMPLE 38

1-[3-(2,2-dipropyl-1,3-dioxolan-4-yl)propyl]-4-phenylpiperazine maleate

By the procedure described in Example 36, using 4,4-dipropoxyheptane (preparation 11) in place of 3,3-dipropoxypentane, 1-[3-(2,2-dipropyl-1,3-dioxolan-4-yl)propyl] 4-phenylpiperazine maleate was obtained, melting at 118–123° C.

*Analysis.*—Calculated for $C_{22}H_{36}N_2O_2 \cdot C_4H_4O_4$ (percent): C, 65.52; H, 8.46; N, 5.88. Found (percent): C, 65.49; H, 8.77; N, 6.01.

EXAMPLE 39

1-[4-(2,2-dimethyl-1,3-dioxolan-4-yl)butyl]-4-phenylpiperazine maleate

Eighty-three grams of 1-[4-(2-ethyl-2-phenyl-1,3-dioxolan-4-yl)butyl]-4-phenylpiperazine maleate (Example 23) was converted to the free base by treatment with excess NaOH solution. The free base was refluxed in 180 ml. of 7% HCl solution for 15 minutes, and the water and propiophenone were removed at reduced pressures. The residue was heated briefly in n-propanol and part of the solvent was distilled to remove last traces of water. 2,2-dimethoxypropane (66.6 g.) was added along with 0.25 ml. concentrated $H_2SO_4$, and the mixture was refluxed an hour. Twenty-one grams of $NaOCH_3$ was added, the solvent was removed, and the residue was mixed with 75 ml. water and 300 ml. ether. The ether solution was dried over $MgSO_4$, the ether was removed, and the residue was distilled, collecting the fraction boiling at 170–175°/0.2 mm. To a solution of 15 g. of this fraction in 50 ml. ether was added a solution of 4.95 g. maleic acid in 15 ml. ethanol. Dilution with 200 ml. ether produced crystals which were recrystallized from ethanol-ether (1:4) to give 1-[4-(2,2-dimethyl-1,3-dioxolan-4-yl)butyl] 4-phenylpiperazine maleate, melting at 128.5–130.5° C.

*Analysis.*—Calculated for $C_{19}H_{30}N_2O_2 \cdot C_4H_4O_4$ (percent): C, 63.57; H, 7.89; N, 6.45. Found (percent): C, 63.42; H, 7.77; N, 6.45.

EXAMPLE 40

1-(1,4-dioxaspiro[4.5]decan-2-ylmethyl)-4-phenylpiperazine maleate

A mixture of 14.2 g. of 2-chloromethyl-1,4-dioxaspiro-[4.5]decane and 24.5 g. of N-phenylpiperazine was heated at 200° C. for 90 minutes, cooled, and diluted with 150 ml. ether. The crystalline solid was removed by filtration; the filtrate was evaporated, and the residual oil was distilled at 0.1 mm., discarding the forerun boiling up to 160° C. The undistilled pot residue was dissolved in ethanol and a solution of a molar equivalent of maleic acid in ethanol was added. Dilution with about four volumes of ether produced crystals of 1-(1,4-dioxaspiro[4.5]

decan-2-ylmethyl)-4-phenylpiperazine maleate, melting at 144–146° C.

Analysis.—Calculated for $C_{19}H_{28}N_2O_2 \cdot C_4H_4O_4$ (percent): C, 63.87; H, 7.46; N, 6.48. Found (percent): C, 63.99; H, 7.54; N, 6.36.

EXAMPLE 41

1-[2-(1,4-dioxaspiro[4.5]decan-2-yl)ethyl]-4-phenylpiperazine maleate

A mixture of 10 g. of 4-(4-phenylpiperazinyl)-1, 2-butanediol dihydrochloride (preparation 2(C) and 10 g. of cyclohexanone dimethyl acetal in 200 ml. of n-propanol containing a small amount of hydrogen chloride was refluxed for about two hours. The solvent was removed under reduced pressure, the residue was shaken with 75 ml. of 20% NaOH and 200 ml. ether, the ether extract was washed with water, dried, and the ether was removed. The oily residue was converted to the maleate salt as in Example 40, and this was recrystallized from ethanol-ether to give 1-[2-(1,4-dioxaspiro[4.5]decan-2-yl)ethyl]-4-phenylpiperazine maleate, melting at 161.5–163.0° C.

Analysis.—Calculated for $C_{20}H_{30}N_2O_2 \cdot C_4H_4O_4$ (percent): C, 64.55; H, 7.67; N, 6.27. Found (percent): C, 64.39; H, 7.56; N, 6.48.

EXAMPLE 42

1-[4-(2,2-dimethyl-1,3-dioxolan-4-yl)butyl]-4-phenylpiperazine (alternate procedure)

A mixture of 50 g. of 4-(2,2-dimethyl-1,3-dioxolan-4-yl)-butyl methanesulfonate (preparation 14) and 67.8 g. of N-phenylpiperazine was heated on the steam bath for two hours. The mixture was stirred in ether, filtered, and the ethereal filtrate was washed three times with water. After removing the solvent, the oily residue was heated to 150° at 0.7 mm. to remove N-phenylpiperazine. The 1-[4 - (2,2 - dimethyl - 1,3 - dioxolan - 4 - yl)butyl]-4-phenylpiperazine is sufficiently pure at this point to convert to the maleic acid salt as described in Example 39.

EXAMPLE 43

1-[5-(2,2-dimethyl-1,3-dioxolan-4-yl)pentyl]-4-phenylpiperazine maleate

A mixture of 12.4 g. of the mesylate from preparation 16(C) and 15.3 g. N-phenylpiperazine was heated on the steam bath for an hour, cooled, and stirred with ether. The ether solution was evaporated and the residue was distilled, collecting the fraction boiling at 170°–180°/0.05 mm. (7.5 g.). This was dissolved in 50 ml. ether and treated with 2.6 g. maleic acid in 10 ml. ethanol. 1-[5-(2,2-dimethyl-1,3-dioxolan - 4 - yl)pentyl] - 4 - phenylpiperazine maleate was obtained, melting at 111–114° C.

Analysis.—Calculated for $C_{20}H_{32}N_2O_2 \cdot C_4H_4O_4$ (percent): C, 64.26; H, 8.09; N, 6.25. Found (percent): C, 64.52; H, 7.99; N, 6.39.

EXAMPLE 44

1-[2-(2,2-dihexyl-1,3-dioxolan-4-yl)ethyl]-4-phenylpiperazine hydrochloride

A mixture of 15.0 g. of 4-(4-phenylpiperazinyl)-1,2-butanediol dihydrochloride (preparation 2(C)) and 20 g. of 7,7-dipropoxytridecane (preparation 18) in 200 ml. propanol was refluxed two hours, neutralized with NaOCH₃, and the solvent was removed. The residue was dissolved in ether, washed with 10 percent NaOH, then three times with water. The ether solution was dried over MgSO₄ and neutralized by the addition of ethereal HCl. The precipitated HCl salt was collected and recrystallized from acetone-hexane to give 1-[2-(2,2-dihexyl-1,3-dioxolan-4-yl)ethyl]-4-phenylpiperazine hydrochloride, melting at 130–132° C.

Analysis.—Calculated for $C_{27}H_{46}N_2O_2 \cdot HCl$ (percent): C, 69.42; H, 10.14; N, 7.59. Found (percent): C, 69.22; H, 9.97; N, 7.58.

What is claimed is:

1. 1-(2-$R_1$,2-$R_2$-1,3-dioxolan-4-yl-alkyl)-4-phenyl-piperazines, wherein alkyl is of 1–6 carbon atoms, inclusive, and $R_1$ and $R_2$ each are H, alkyl of 1–8 carbon atoms, cycloalkyl of 3–9 ring carbon atoms or phenyl or, collectively, are alkylene of 4–7 carbon atoms, inclusive, and pharmaceutically acceptable acid addition salts thereof.

2. A compound of claim 1 wherein the bridging alkyl group has the formula —$(CH_2)_m$— in which $m$ is 2–4.

3. A compound of claim 2 wherein $m$ is 2.

4. A compound of claim 2 wherein $m$ is 3.

5. A compound of claim 1 wherein at least one of $R_1$ and $R_2$ is alkyl of 1–4 carbon atoms.

6. A compound of claim 5 wherein both $R_1$ and $R_2$ are alkyl.

7. A compound of claim 6 wherein both $R_1$ and $R_2$ are alkyl of at least 3 carbon atoms.

8. A compound of claim 5 wherein the bridging alkyl group has the formula —$(CH_2)_m$— in which $m$ is 2–4.

9. A compound of claim 7 wherein the bridging alkyl group has the formula —$(CH_2)_m$— in which $m$ is 2–4.

10. A pharmaceutically acceptable acid addition salt of claim 1.

11. A hydrochloride of claim 1.

12. A compound of claim 9, 1-[2-(2,2-dibutyl-1,3-dioxolan-4-yl)-ethyl]-4-phenylpiperazine.

13. A compound of claim 9, 1-[3-(2,2-diisopropyl-1,3-dioxolan-4-yl)-propyl]-4-phenylpiperazine.

14. A compound of claim 1 wherein one of $R_1$ and $R_2$ is alkyl and the other is phenyl.

15. A compound of claim 14 wherein the 2-position alkyl group is ethyl.

16. A compound of claim 15, 1-[2-(2-ethyl-2-phenyl-1,3-dioxolan-4-yl)ethyl]-4-phenylpiperazine.

17. A compound of claim 15, 1-[3-(2-ethyl-2-phenyl-1,3-dioxolan-4-yl)propyl]-4-phenylpiperazine.

18. A compound of the formula

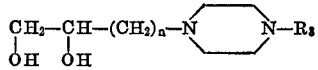

wherein $n$ is 3–6 and $R_3$ is phenyl and pharmaceutically acceptable acid addition salts thereof.

19. A compound of claim 18 wherein $n$ is 3–5.

20. A pharmaceutically acceptable acid addition salt of claim 18.

21. A hydrochloride of claim 18.

22. The compound of claim 18, 5-(4-phenylpiperazinyl)-1,2-pentanediol.

23. The compound of claim 18, 6-(4-phenylpiperazinyl)-1,2-hexanediol.

24. The compound of claim 18, 7-(4-phenylpiperazinyl)-1,2-heptanediol.

References Cited

UNITED STATES PATENTS

| | | | |
|---|---|---|---|
| 2,769,808 | 11/1956 | Tenenbaum | 260—268 H |
| 3,163,649 | 1/1964 | Morren | 260—268 PH |
| 3,371,091 | 2/1968 | Boissier | 260—268 H |

FOREIGN PATENTS

| | | | |
|---|---|---|---|
| 1,554,878 | 1/1969 | France | 260—268 H |
| 774,123 | 12/1967 | Canada | 260—268 H |

DONALD G. DAUS, Primary Examiner

U.S. Cl. X.R.

260—268 BC, 268 TR, 268 BZ, 268 FT, 999

UNITED STATES PATENT OFFICE
CERTIFICATE OF CORRECTION

Patent No. 3,770,743    Dated November 6, 1973

Inventor(s) WALDO RICHARD HARDIE ET AL

It is certified that error appears in the above-identified patent and that said Letters Patent are hereby corrected as shown below:

Column 6, line 38: the "III" should be <u>under</u> the cyclic structure at the right side of the column.

Column 9, line 9: "$(nH_{2n})$" should be --$(C_nH_{2n})$--.

Column 9, lines 16-18:

Column 10, line 66: "propionphe-" should be --propiophe--.

Column 11, line 19: "anesulfonane" should be --anesulfonate--.

, line 40: "27.0°" should be -- -27.0° --.

, line 46: "4.3°" should be -- -4.3° --.

Column 12, line 1: "3-(2-ethyl-" should be --4-(2-ethyl---.

Column 14, line 57: before the word "hydrochloride" insert the following: --was heated on the steam bath for 24 hours, cooled, and diluted with dry ether to give 4.4 g. of N-phenylpiperazine Column 15, line 1: "al" should be --of--.

, line 36: "4-'4" should be --4-(4--.

, line 43: delete "washed."

Column 17, line 36: after "phenyl-" insert --1--.

Column 19, line 62: "was" should be --and--.

Signed and sealed this 16th day of April 1974.

(SEAL)
Attest:

EDWARD M.FLETCHER,JR.
Attesting Officer

C. MARSHALL DANN
Commissioner of Patents